United States Patent
Kirsch et al.

(10) Patent No.: US 7,370,120 B2
(45) Date of Patent: May 6, 2008

(54) METHOD AND SYSTEM FOR REDUCING NETWORK LATENCY IN DATA COMMUNICATION

(75) Inventors: Steven T. Kirsch, Los Altos Hills, CA (US); David J. Murray, North Hampton, NH (US)

(73) Assignee: Propel Software Corporation, San Jose, CA (US)

( * ) Notice: Subject to any disclaimer, the term of this patent is extended or adjusted under 35 U.S.C. 154(b) by 913 days.

(21) Appl. No.: 10/012,743

(22) Filed: Dec. 7, 2001

(65) Prior Publication Data

US 2003/0110296 A1   Jun. 12, 2003

(51) Int. Cl.
G06F 15/16 (2006.01)
G06F 7/00 (2006.01)
G06F 17/00 (2006.01)
H04K 1/00 (2006.01)

(52) U.S. Cl. .................. 709/246; 709/231; 707/100; 707/101; 380/269

(58) Field of Classification Search ............... None
See application file for complete search history.

(56) References Cited

U.S. PATENT DOCUMENTS

| | | | |
|---|---|---|---|
| 4,899,128 A * | 2/1990 | Shapiro | 340/146.2 |
| 5,406,279 A * | 4/1995 | Anderson et al. | 341/51 |
| 5,410,671 A | 4/1995 | Elgamal et al. | 395/425 |
| 5,488,364 A * | 1/1996 | Cole | 341/50 |
| 5,590,317 A | 12/1996 | Iguchi et al. | 395/602 |
| 5,907,711 A | 5/1999 | Benitez | 395/709 |
| 5,949,355 A | 9/1999 | Panaoussis | 341/51 |
| 5,953,503 A * | 9/1999 | Mitzenmacher et al. | 709/203 |
| 6,088,484 A | 7/2000 | Mead | 382/232 |
| 6,115,384 A | 9/2000 | Parzych | 370/401 |
| 6,115,385 A | 9/2000 | Vig | 370/401 |
| 6,121,901 A | 9/2000 | Welch et al. | 341/51 |

(Continued)

FOREIGN PATENT DOCUMENTS

WO   WO99/09480   2/1999

OTHER PUBLICATIONS

Kanai et al, Machine Translation of Japanese Application No. 2001-069286, Mar. 3, 2001.*

(Continued)

*Primary Examiner*—Bunjob Jaroenchonwanit
*Assistant Examiner*—Dohm Chankong
(74) *Attorney, Agent, or Firm*—Schneck & Schneck; Thomas Schneck

(57) ABSTRACT

Methods and systems for accelerating data communication by reducing network latency particularly by data compression in which requested data is recursively compressed by an encoder and sent to the requester in codes which may or may not be understood by the requester. The requester can subsequently request data corresponding to unknown codes. The request-reply sequence is also recursive and continues until the requested data is present at the requester. To further accelerate communication, a persistently connected network is employed, together with a new socket layer capable of combining multiple messages from different machines, threads, and/or processes into single TCP/IP packets to be relayed along message hubs in the persistent network. These features are introduced singly and combined to create a new caching network. A new content distribution network can take advantage of these data communication improvements since requested content can be distributed in caches in a caching network.

14 Claims, 13 Drawing Sheets

U.S. PATENT DOCUMENTS

| | | | |
|---|---|---|---|
| 6,178,461 B1* | 1/2001 | Chan et al. | 709/247 |
| 6,188,333 B1 | 2/2001 | Cooper | 341/51 |
| 6,192,155 B1 | 2/2001 | Fan | 382/232 |
| 6,215,907 B1 | 4/2001 | Kumar et al. | 382/240 |
| 6,249,844 B1* | 6/2001 | Schloss et al. | 711/122 |
| 6,253,264 B1 | 6/2001 | Sebastian | 710/68 |
| 6,272,568 B1 | 8/2001 | Ishihara | 710/68 |
| 6,295,008 B1 | 9/2001 | Kondo et al. | 341/50 |
| 6,307,962 B1* | 10/2001 | Parker et al. | 382/170 |
| 6,414,610 B1 | 7/2002 | Smith | 341/106 |
| 6,415,280 B1* | 7/2002 | Farber et al. | 707/2 |
| 6,697,844 B1* | 2/2004 | Chan et al. | 709/206 |
| 6,728,785 B1* | 4/2004 | Jungck | 709/247 |
| 6,757,717 B1 | 6/2004 | Goldstein | 709/217 |
| 6,810,398 B2* | 10/2004 | Moulton | 707/6 |
| 6,813,690 B1* | 11/2004 | Lango et al. | 711/118 |
| 6,826,626 B1* | 11/2004 | McManus | 709/246 |
| 6,912,645 B2* | 6/2005 | Dorward et al. | 711/216 |
| 7,143,088 B2* | 11/2006 | Green et al. | 707/3 |
| 2002/0010797 A1* | 1/2002 | Moulton | 709/247 |
| 2002/0037035 A1* | 3/2002 | Singh | 375/240 |
| 2002/0038296 A1* | 3/2002 | Margolus et al. | 707/1 |
| 2002/0080871 A1* | 6/2002 | Fallon et al. | 375/240 |
| 2004/0049598 A1* | 3/2004 | Tucker et al. | 709/246 |

OTHER PUBLICATIONS

Cohen, Jonathan D., "Recursive Hashing Functions for n-Grams," ACM Transactions on Information systems, vol. 15, No. 3, pp. 291-320, Jul. 1997.*

M.C. Chan et al., "Cache-based Compaction: A New Technique for Optimizing Web Transfer", Bell Laboratories, Networking Software Research Dept., citeseerPSU:247762, Jun. 21, 1999, 9 pages.

Website printout: www. fourelle.com/products.html, from Fourelle Products, Mar. 1, 2002, 4 pages.

Website printout: www.vigos.com/products/wa, "VIGOS Website Accellerator", from Vigos AG, Mar. 1, 2002, 1 pg.

Website printout: www. fireclick/solutions/technologies.html, from Fireclick, Oct. 2, 2001, 3 pages.

R. Srinivasan, "Web Experience Management", Fireclick, Inc., published in DM Direct, Jun. 28, 2002, 7 pages.

Website printout: www. peribit.com/products/index.html, Peribit Networks, Mar. 1, 2002, 3 pages.

Website printout: www. peribit/products/technology.html, Peribit Networks, Mar. 1, 2002, 2 pages.

J. Nagle, "Congestion Control in IP/TCP Internetworks", Interne RFC/STD/FYI/BCP Archives, RFC896, Ford Aerospace and Communications Corp., 8 pages, Jan. 6, 1984.

J. Gettys et al., "SMUX Protocol Specification", W3C (MIT, INRIA, Kejo), Working Draft Jul. 10, 1998, 16 pages.

Bang Networks™ Technology Overview, Bank Networks Inc., 2001, 6 pages.

Paper from FineGround Networks, Inc., "Deploying FineGround Condensers in an SSL Environment", 2001, 6 pages.

Paper from Fireclick, Inc., "Last Mile Acceleration—An Introduction to Fireclick's Differential Caching and Predictive Caching Technologies", Jul. 2001, 6 pages.

Paper from NetScaler, Inc., "Maximize Cache Investment—How to Improve the Performance and Capacity of a Caching Infrastructur While Scaling Down Costs", Aug. 2001, 7 pages.

Paper from NetScaler, Inc., "Eliminate Net Wait—How to Reduce WAN Latency and Gain a Global Advantage While Scaling Down Costs", Aug. 2001, 8 pages.

Paper from Akamai ORACLE, "Edge Side Includes (ESI) Overview", Oracle Corporation, Akamai Technologies, May 2001, 7 pages.

* cited by examiner

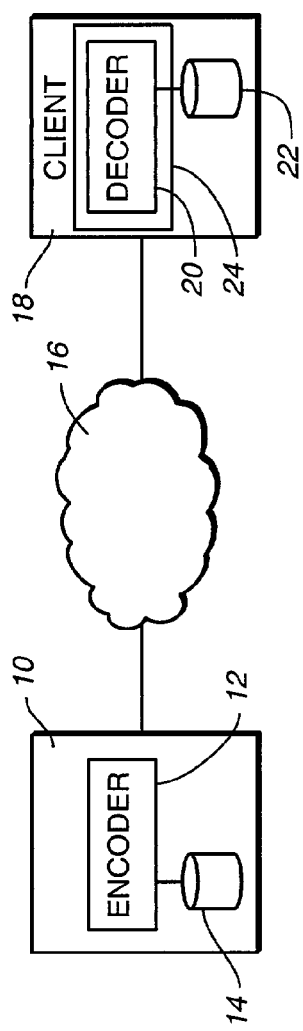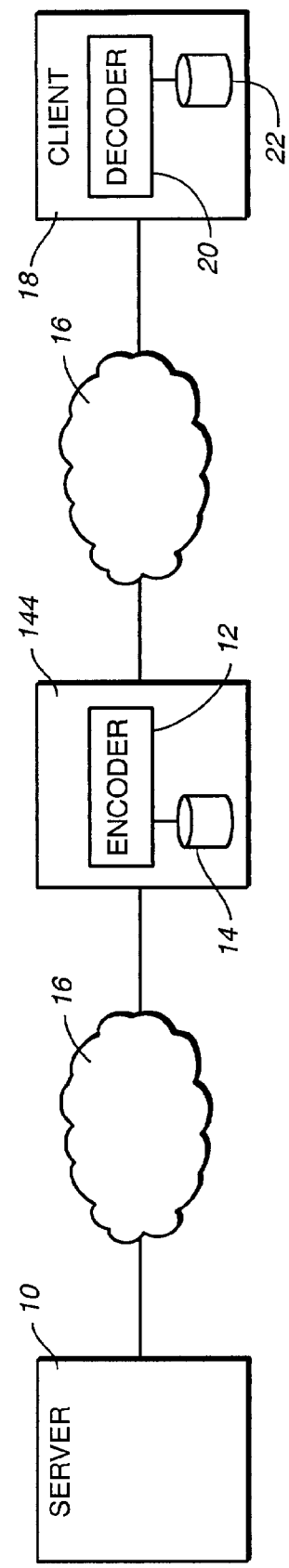

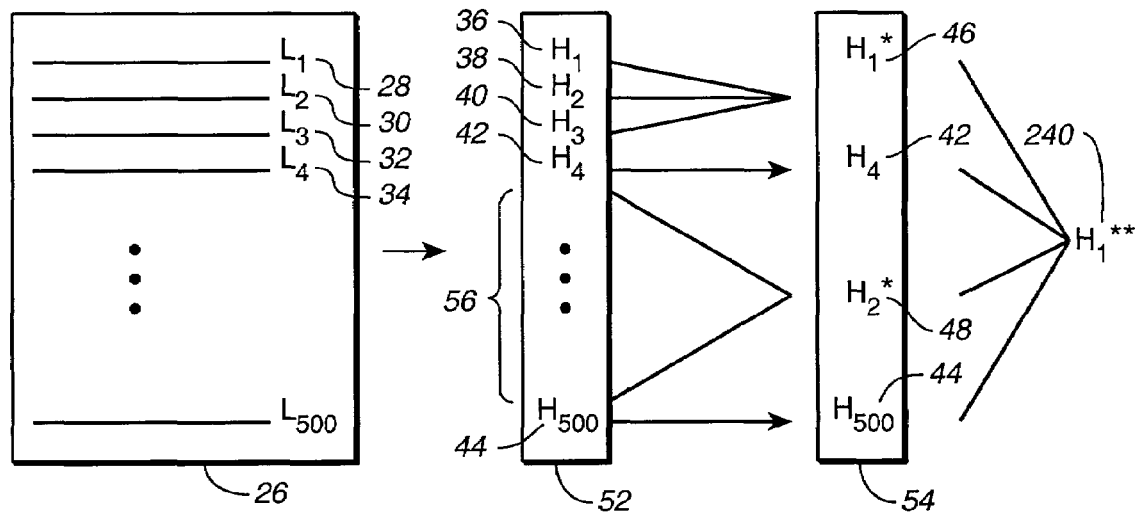
FIG._2a
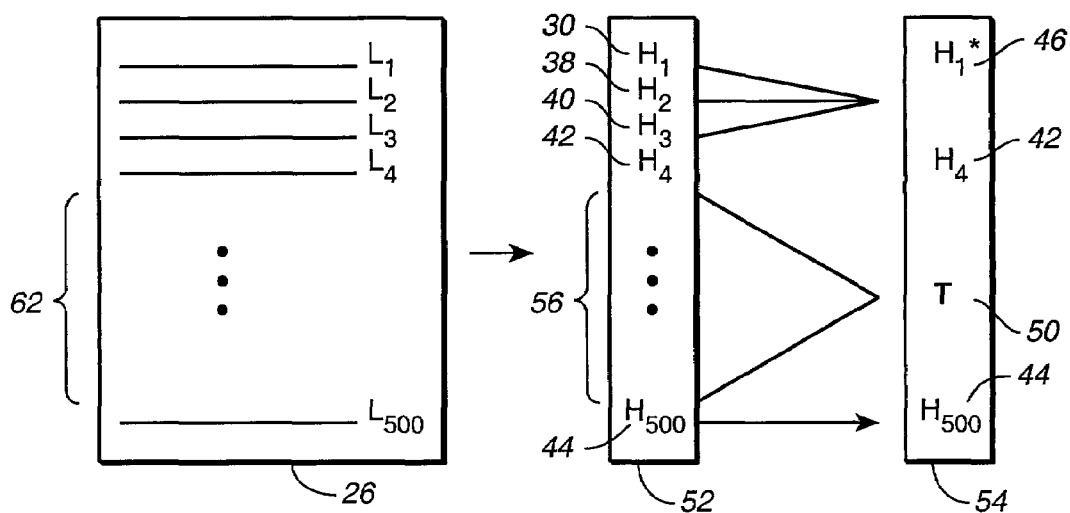
FIG._2b

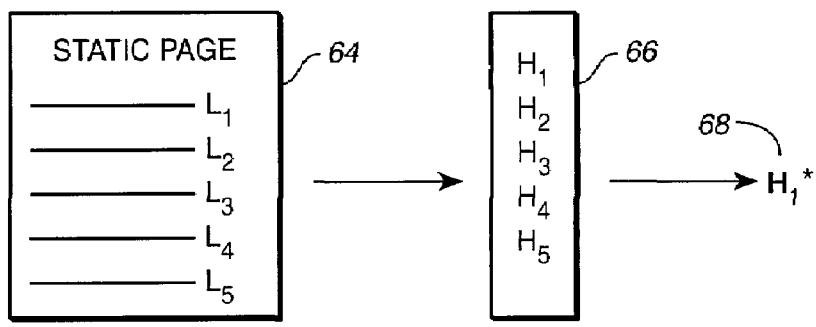
FIG._2c
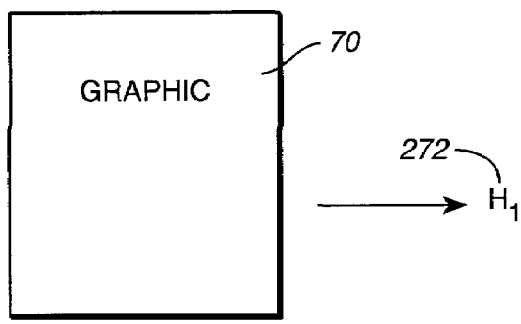
FIG._2d
DETECTING RUNS
| HASH CODES GENERATED 1st TIME FOR: | SAME HASH CODES PRESENT: | | | REPRESENTATIVE HASH CODE |
|---|---|---|---|---|
| | 1st TIME | 2nd TIME | 3rd TIME | |
| LINE 1  ($H_1$) | ✓ | ✓ | ✓ | $H_1^*$ |
| LINE 2  ($H_2$) | ✓ | ✓ | ✓ | |
| LINE 3  ($H_3$) | ✓ | ✓ | ✓ | |
| LINE 4  ($H_4$) | ✓ | x | ✓ | $H_4$ |
| LINE 5  ($H_5$) | ✓ | ✓ | ✓ | $H_2^*$ |
| LINE 6  ($H_6$) | ✓ | ✓ | ✓ | |
| LINE 7  ($H_7$) | ✓ | ✓ | ✓ | |
| LINE 8  ($H_8$) | ✓ | ✓ | ✓ | |
| LINE 9  ($H_9$) | ✓ | ✓ | ✓ | |
| LINE 10 ($H_{10}$) | ✓ | ✓ | ✓ | |
| LINE 11 ($H_{11}$) | ✓ | ✓ | ✓ | |
| LINE 12 ($H_{12}$) | ✓ | ✓ | ✓ | |
FIG._3

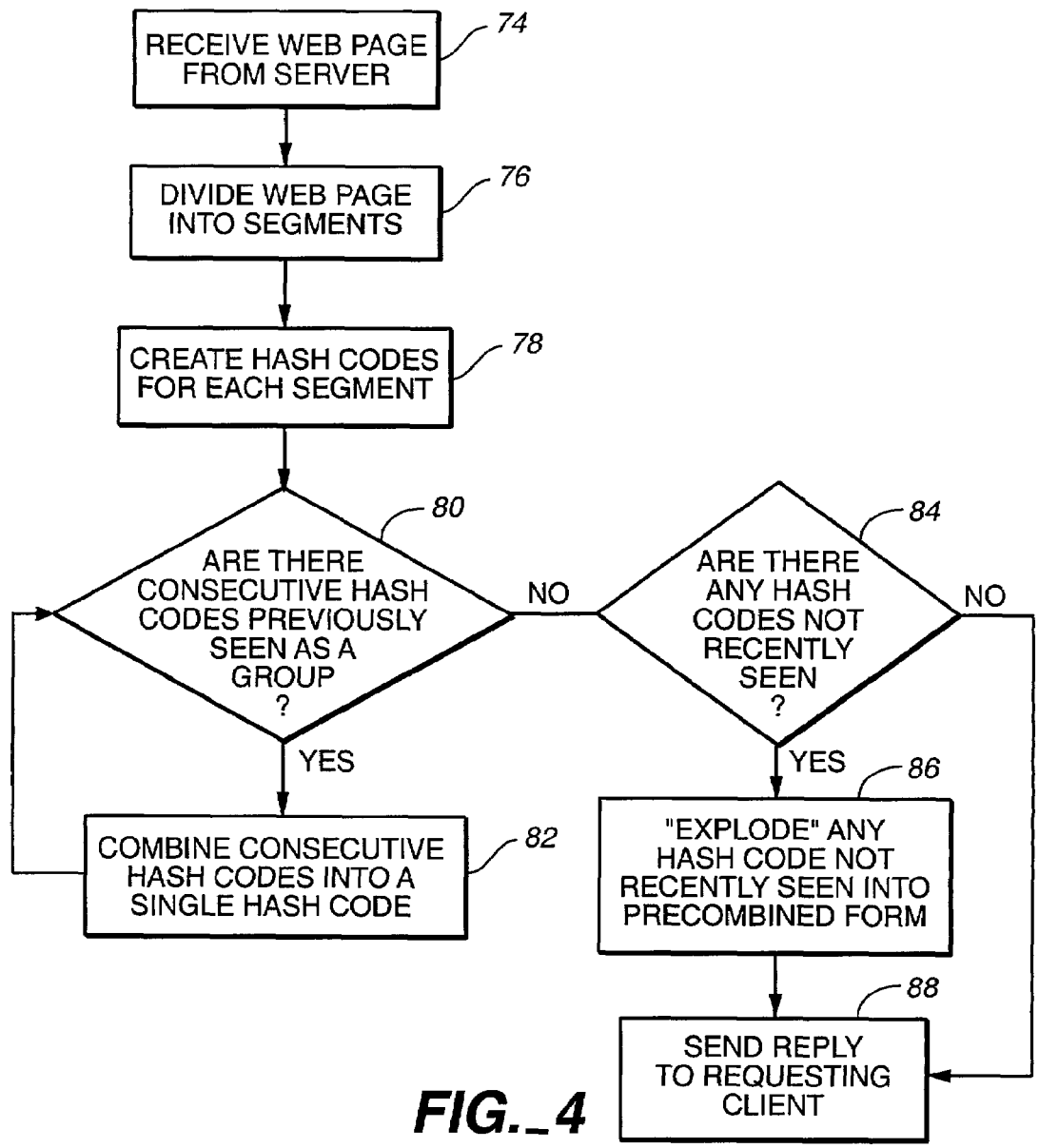
FIG._4

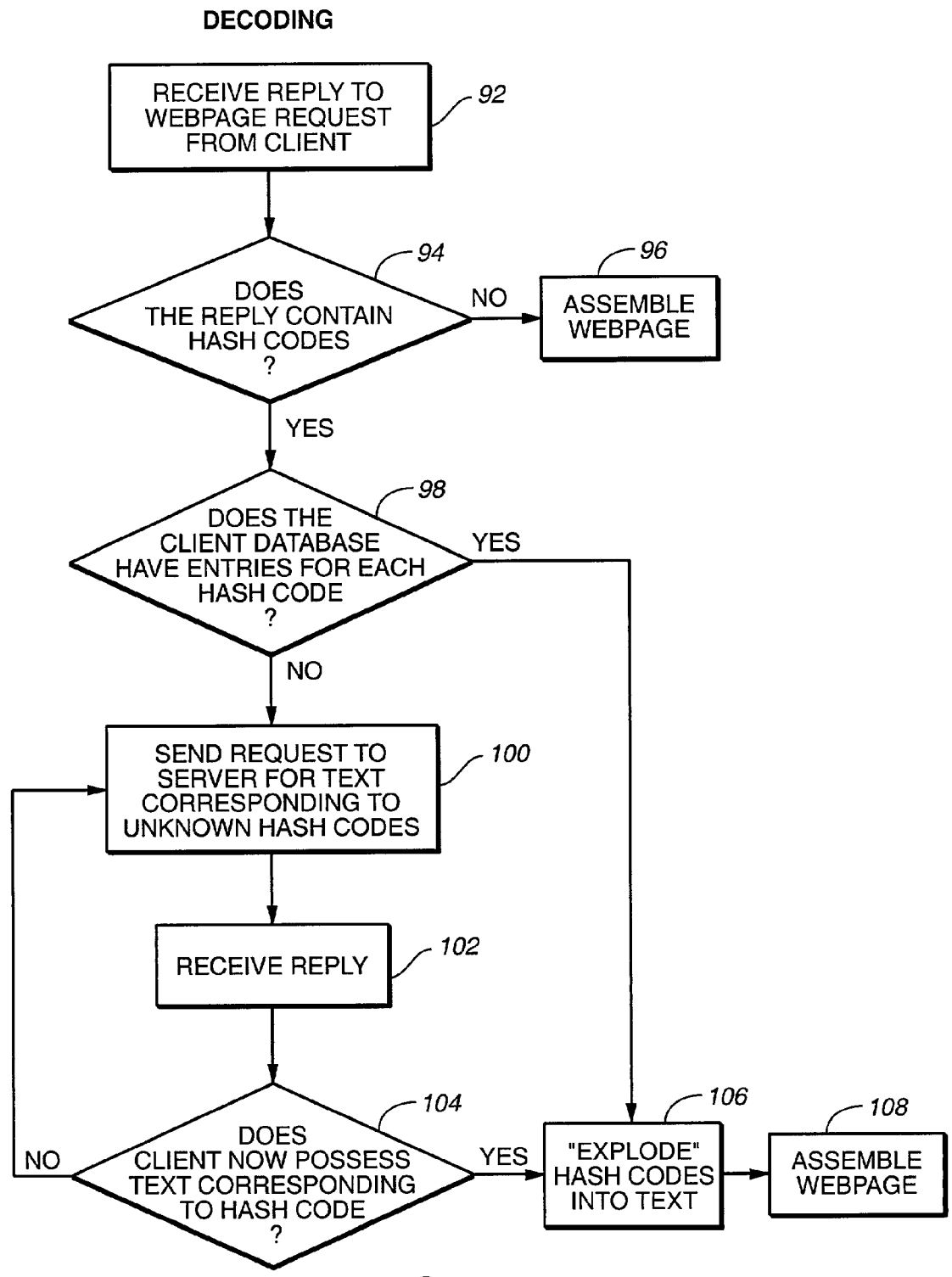
FIG._5

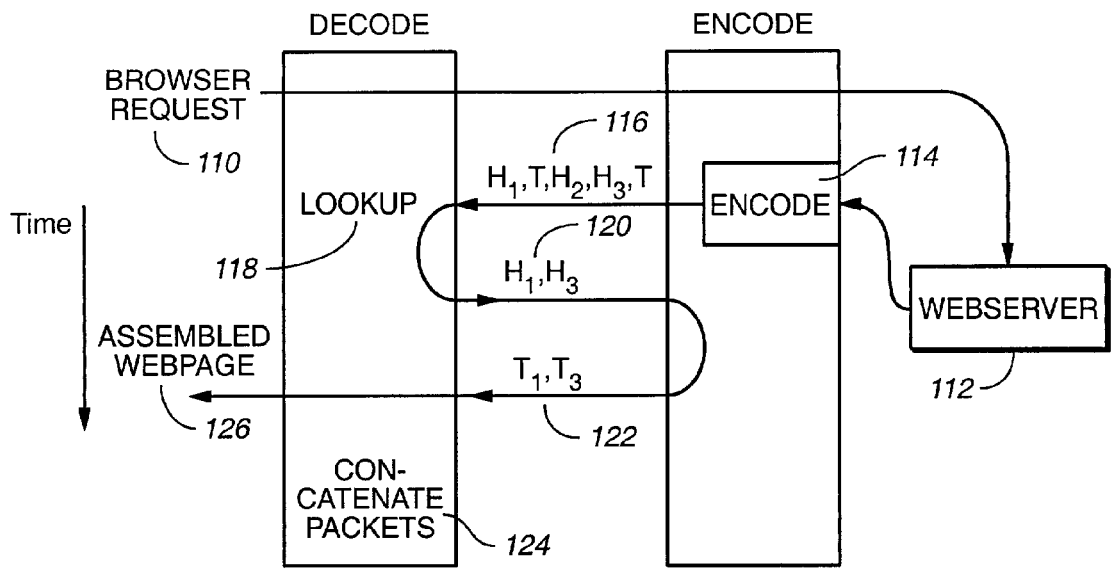
FIG._6a
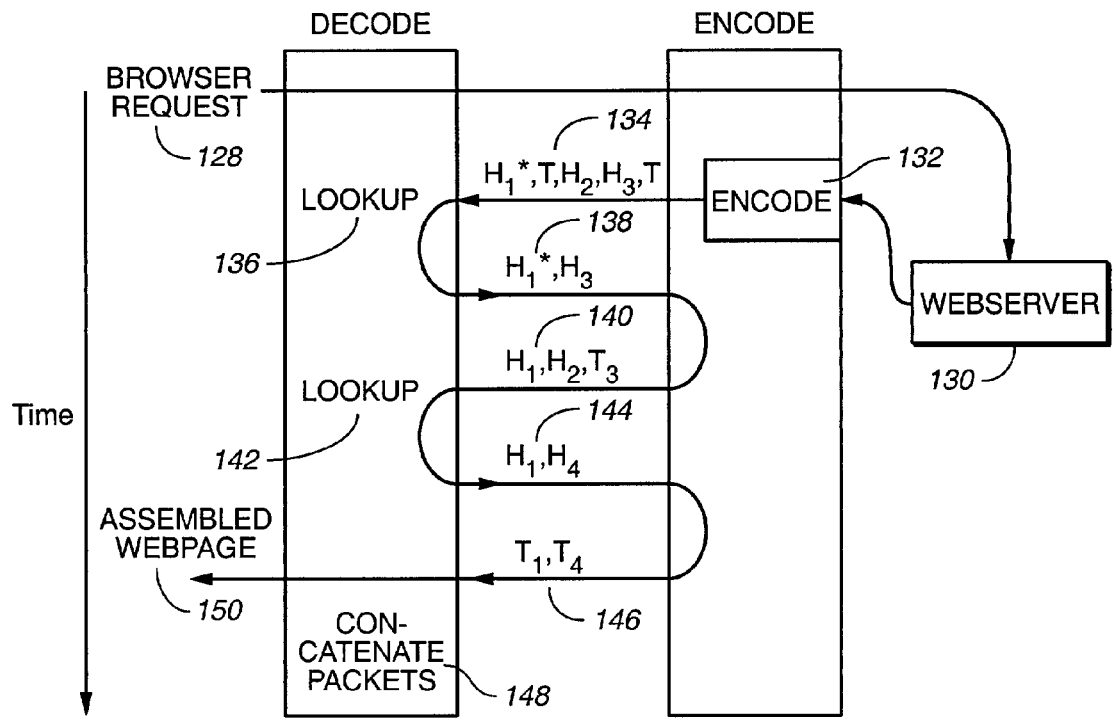
FIG._6b

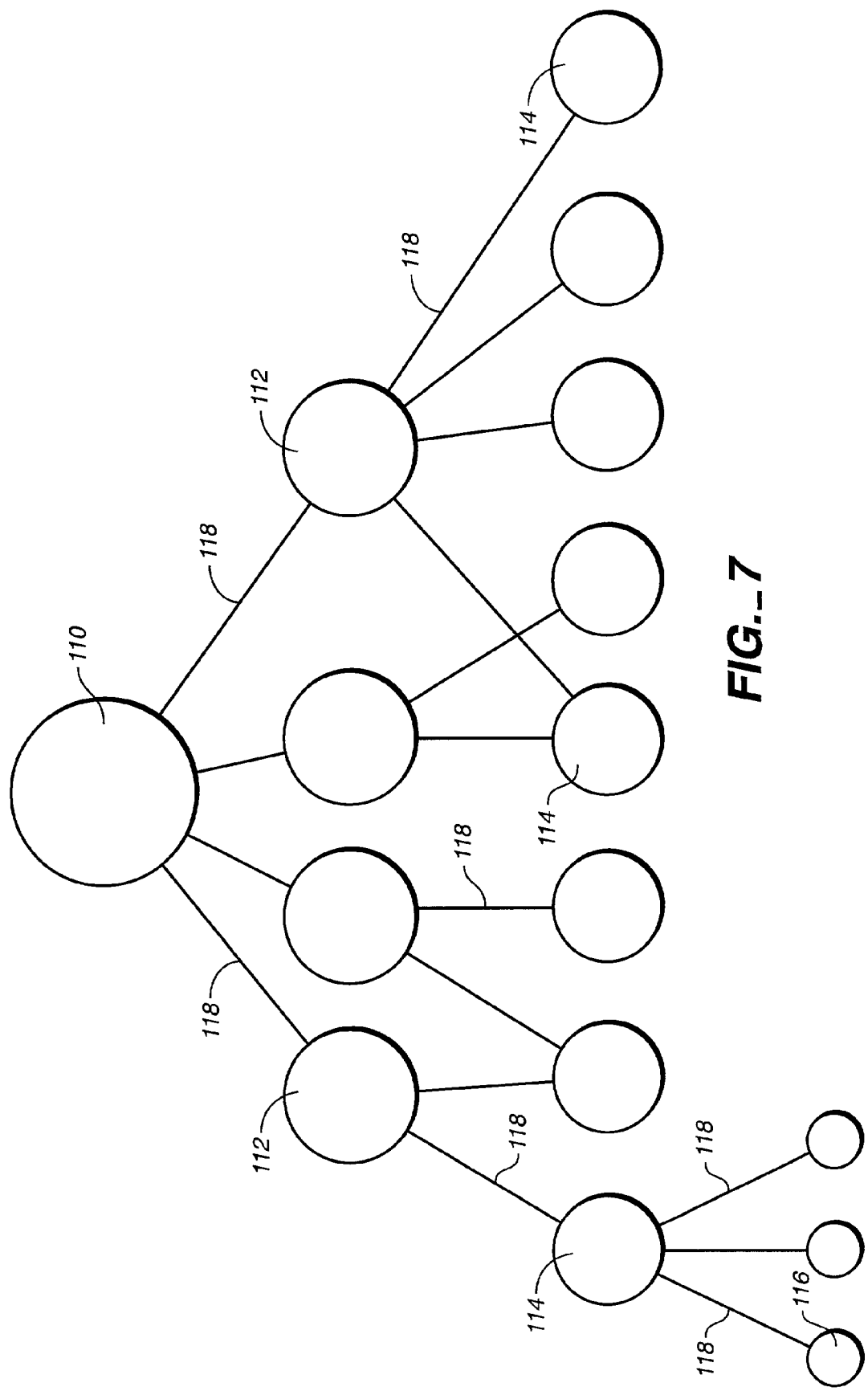
FIG._7

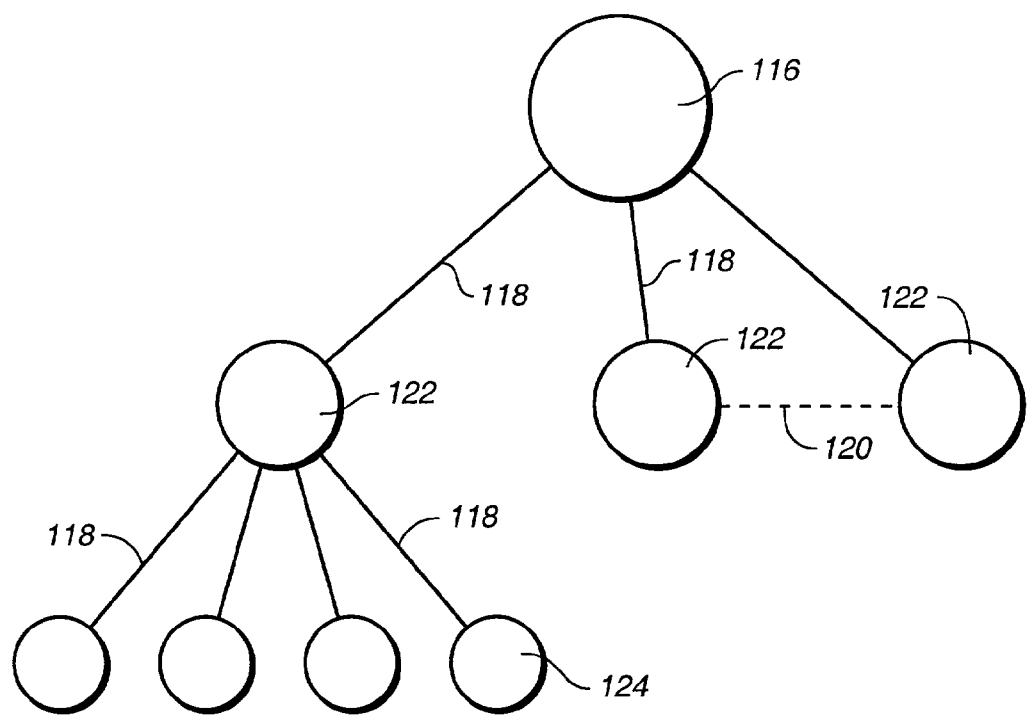
FIG._8
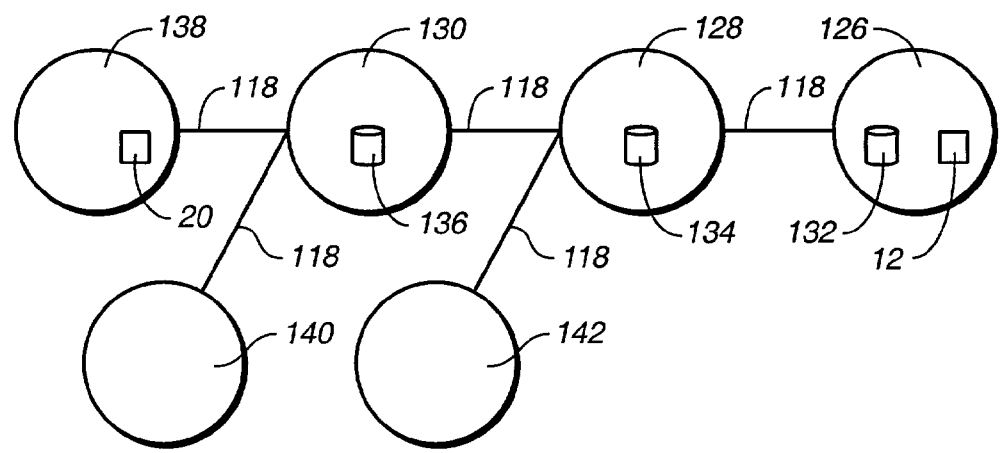
FIG._9

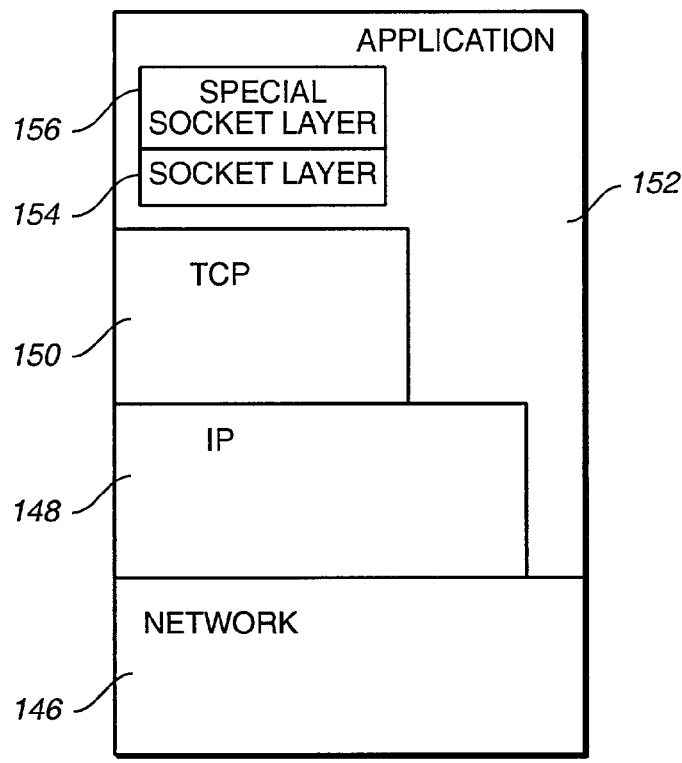
FIG._10
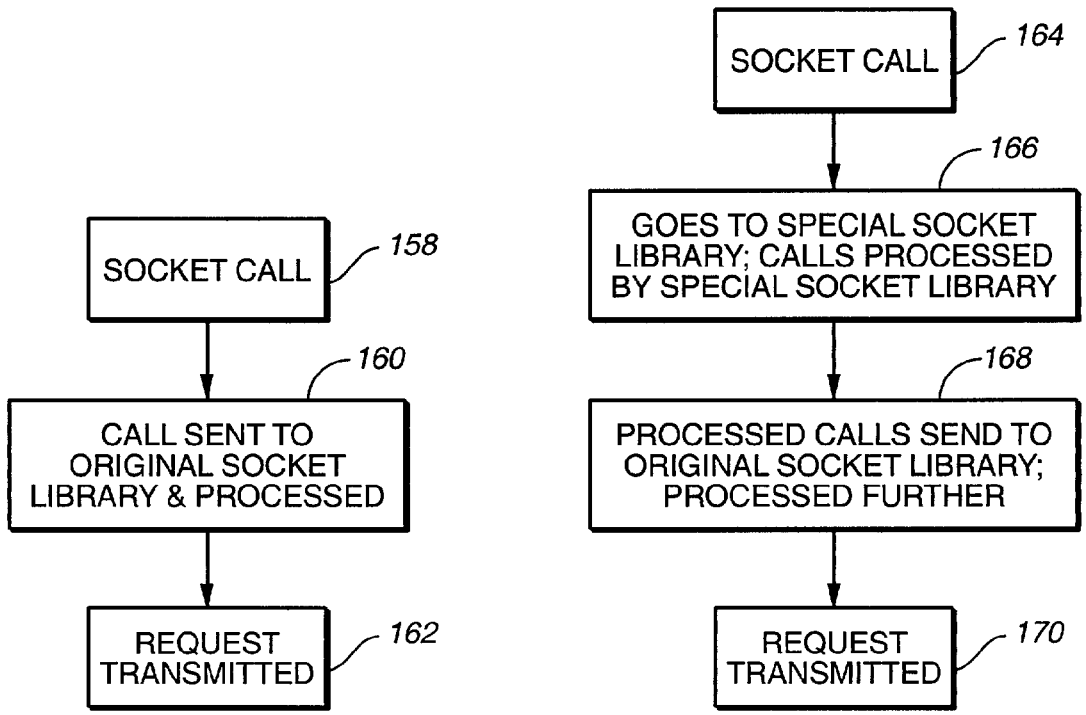
FIG._11a
(PRIOR ART)
FIG._11b

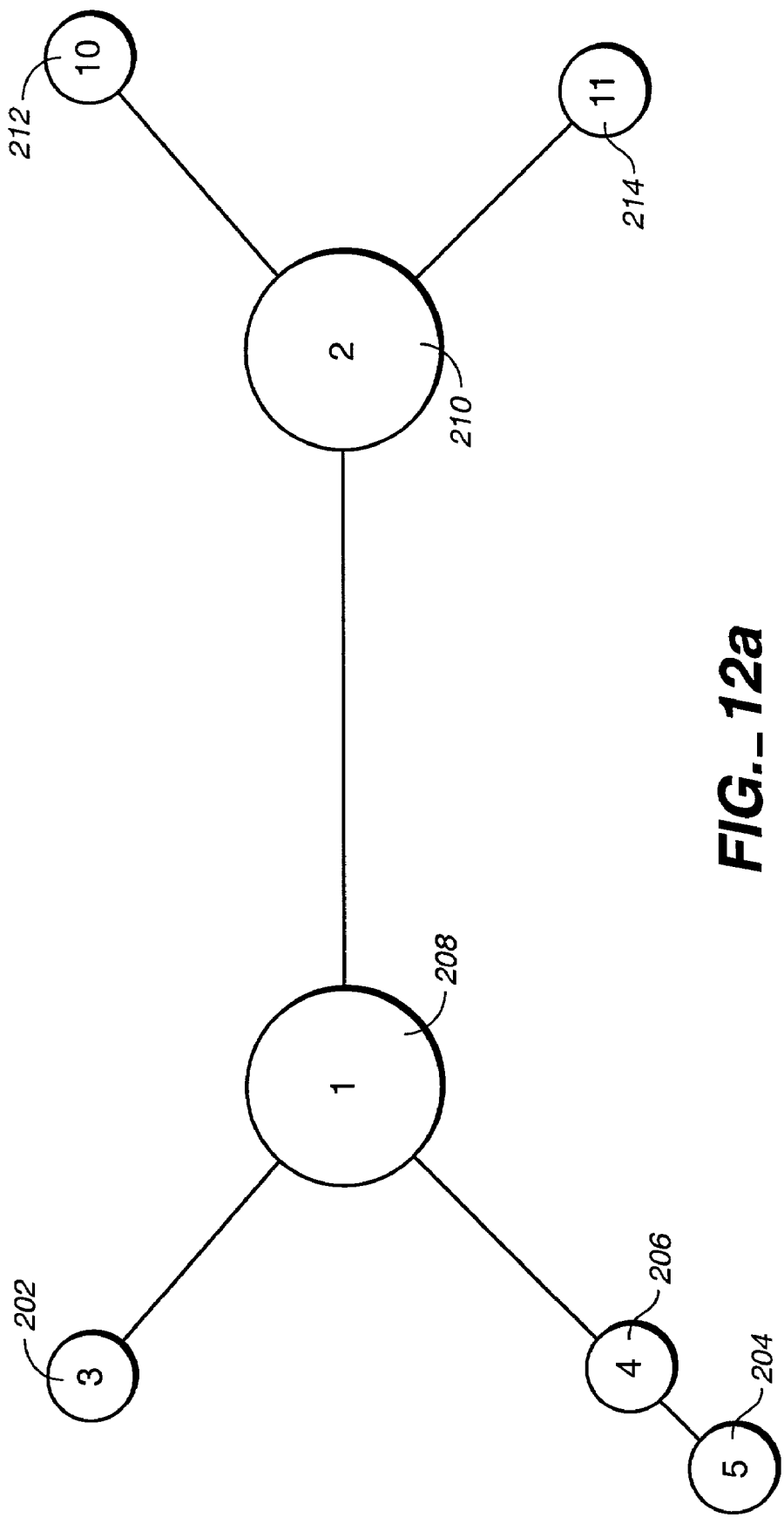
FIG._12a

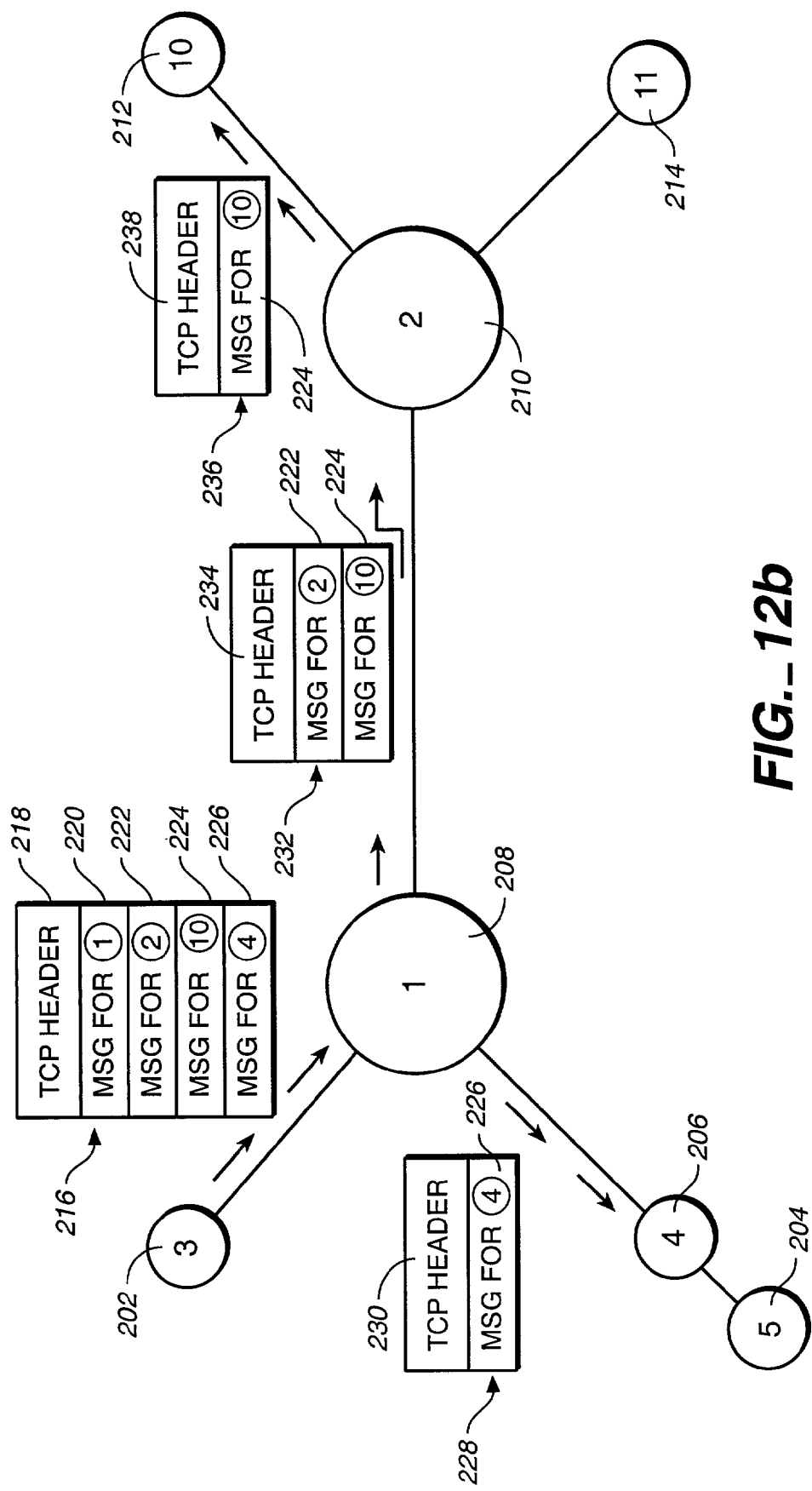
FIG._12b

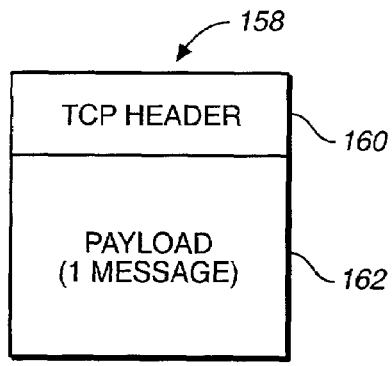
FIG._13a
*(PRIOR ART)*
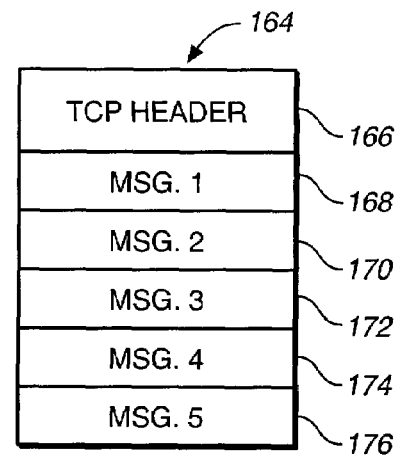
FIG._13b
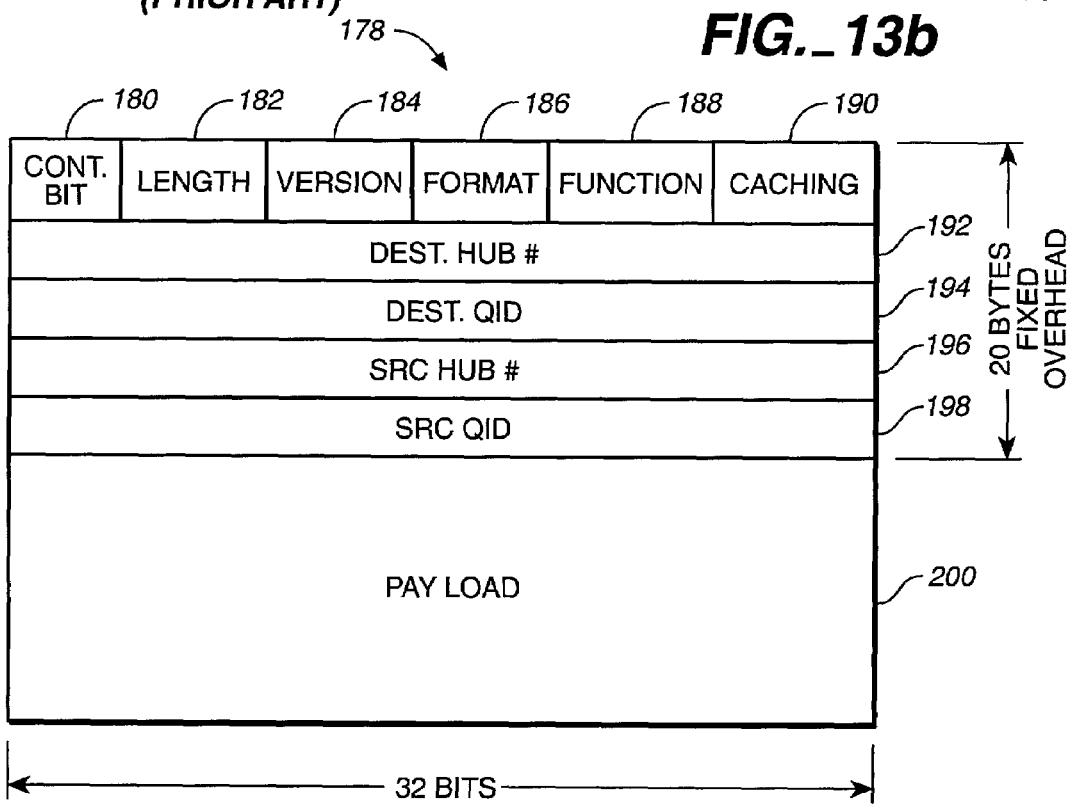
FIG._14
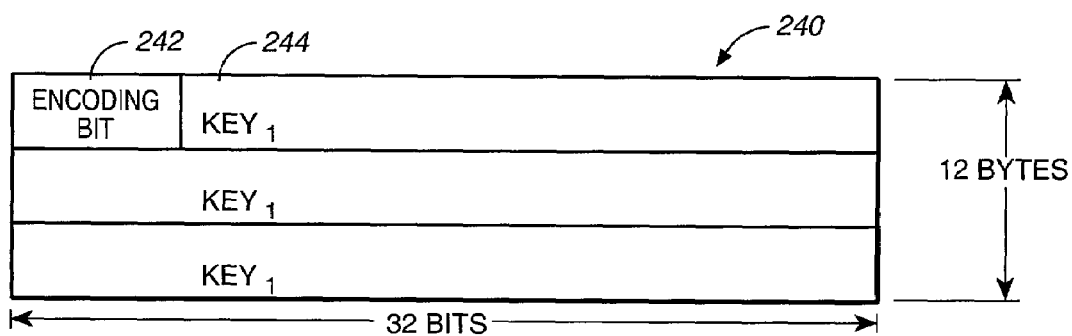
FIG._15

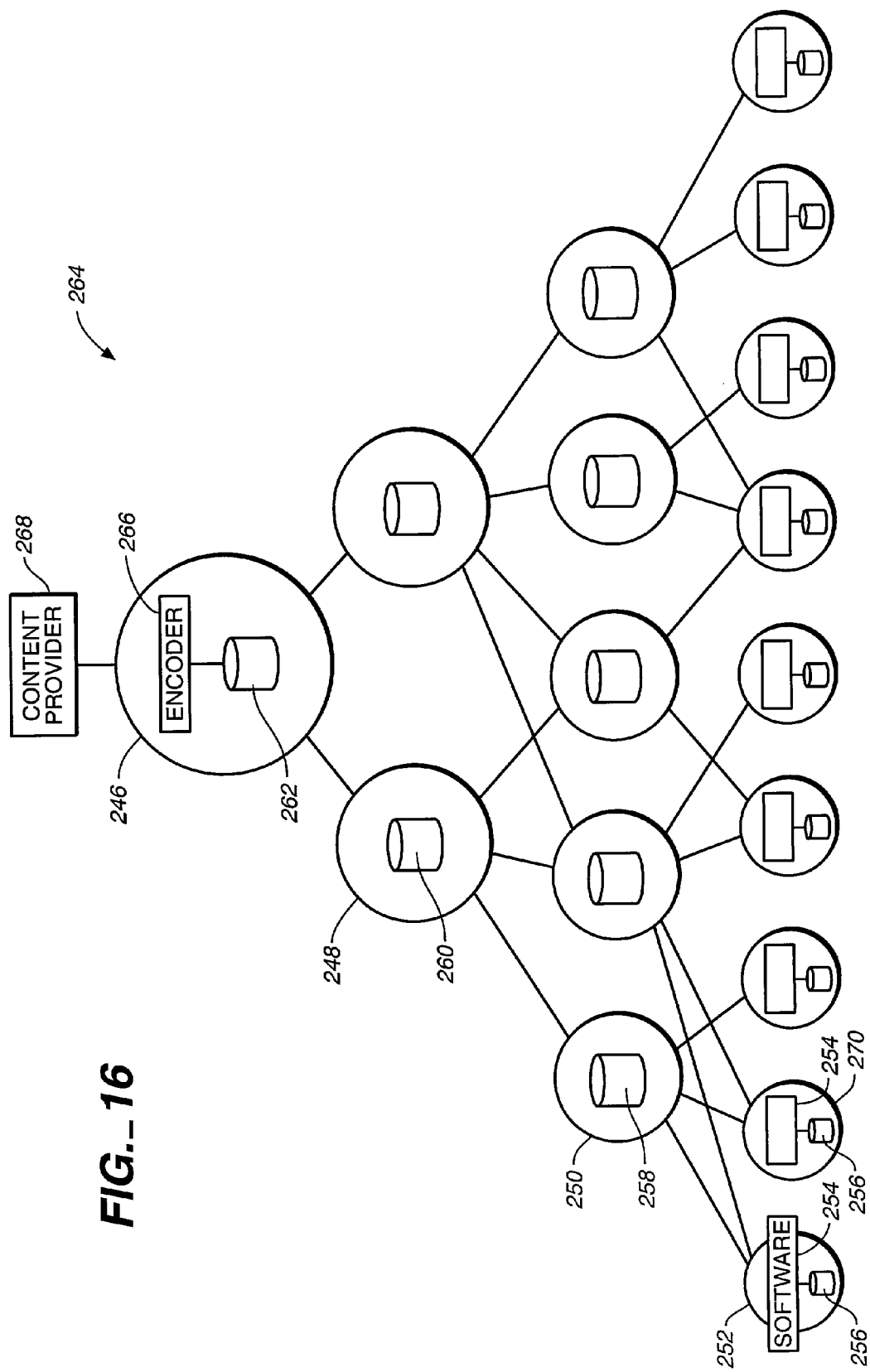
FIG._16

METHOD AND SYSTEM FOR REDUCING NETWORK LATENCY IN DATA COMMUNICATION

TECHNICAL FIELD

This invention is concerned with data communication, particularly compression techniques, network topology, and network software, especially as they relate to reducing network latency.

BACKGROUND ART

Much of the Internet is dedicated to the World Wide Web, a system of data communication featuring visual pages of information, known as Web pages, displayed on computers pursuant to a request from a user. Web pages are created in hypertext markup language, more frequently known by the acronym "HTML," as well as related high level page description languages. These languages use ordinary text to describe Web pages, with the text being transmitted from a server over the Internet to programs running on users' computers known as "browsers" that interpret the HTML code and create corresponding Web pages for viewing. The downloading of Web pages by users, also called clients, from servers takes considerable time at low bandwidths, common to most homes, and takes noticeable amounts of time at bandwidths used by many businesses. This delay is due to a combination of factors: slow servers, modem and network latency, and the bandwidth of the communication pipe. There is considerable ongoing effort to expand Internet bandwidth so that Web pages and associated files can be transmitted more rapidly.

Part of the reason for network bottlenecks is due to Web pages containing dynamic content, content that is created "on the fly." While dynamic content (for example, stock quotes or breaking news stories) on pages may represent only a small proportion of the page's content, the entire page must be transmitted every time a user requests the page. If a user requests a page repeatedly over a short period of time, for instance if the user is tracking a certain stock's activity and requests a page with the stock quote five times in an hour, this page must be assembled and transmitted to the user for each request. This burdens both the server, which has to create the page, and the network which transmits the information from the user to the server.

The idea of expanding Internet bandwidth by data compression is known. Programs, such as GZIP, ZIP and LZP, exist for file compression. Picture and video file compression exist under standards such as MPEG and JPEG.

LZW is another file compression scheme. A file is compressed using a table-based lookup algorithm. LZW is suitable for text compression as well as image compression, which can produce GIF and TIFF image formats. A sample LZW compression algorithm works as follows. An input sequence of bits of a given length as well as a shorter code associated with that sequence is entered into a table. If, as more input is read, a particular sequence is repeated, the shorter code is substituted, thereby achieving compression of the file. The look-up table is included with the compressed file for decoding purposes. The transmission of the look-up table with the compressed file is inefficient since it requires the use of bandwidth in excess of what would be required to transmit the file alone.

Recently, computer scientists have realized that there could be compression of Internet data by observing sequences of data bits and assigning unique labels to these sequences. Peribit Networks, Inc. of Santa Clara, Calif., recently introduced a commercial product which is reported to use pattern-recognition algorithms that were used at Stanford University by Dr. Amit Singh to capture recurring sequences of base pairs in DNA for subsequent analysis. Applying the algorithm to data traffic, Peribit's software spots repetitive patterns in data packets and assigns labels to those patterns. The benefit is that by substituting the labels for repeating data packets, overall Internet traffic loads are claimed to be reduced by as much as 70%, perhaps more. The new compression scheme resembles other data-compression schemes, such as those used to create ZIP and LZP files where a token is inserted wherever there are repetitive strings of data. When decompressed, the tokens are expanded back into the original strings.

Most file compression schemes work within a defined range of a certain number of bytes of information. In contrast, Peribit's algorithms scour streaming WAN packet streams over time without such a restriction. The Peribit software eliminates the file packing and unpacking associated with traditional compression. While the effort by Peribit is commendable, it is computationally expensive and requires purchase of computer hardware for both the server and client. Peribit is a point-to-point solution that is not suitable for applications such as web serving where there are millions of clients, none of which have the Peribit hardware. In addition, like LZW compression, Peribit transmits the token table with the compressed file and therefore has the same inefficiency as LZW compression.

Mun Choon Chan and Thomas Y. C. Woo's paper "Cache-based Compaction: A New Technique for Optimizing Web Transfer" proposes a new technique to reducing Web latency over a slow link. Chan and Woo argue that Web page service latency can be reduced when similar objects (e.g., Web pages having the same or similar URLs) that have been requested and transmitted to the requester are used as references. If a requesting client has an older version of the requested page in its cache, only the changes, or deltas, in the current page need to be sent to the client. Although this paper discusses general approaches to the concept of cache-based compaction, no specific implementations were discussed.

Fourelle Systems, Inc. markets a bandwidth optimization product called Venturi. Venturi uses a collection of standard and proprietary algorithms to compress HTTP, HTML, POP3, SMTP, FTP and NNTP data. Fourelle's product determines the type of data being transmitted and applies the most appropriate compression methods at the application layer. U.S. Pat. No. 6,115,385, assigned to Fourelle, provides a gateway architecture which converts the native protocols of the client application and the server to a bandwidth-efficient protocol. The compression that can be achieved using this approach is limited to the type of algorithm called for each type of data. In other words, maximum compression may not be achieved for certain data types.

Vigos AG uses a combination of hardware and software for their Vigos Website Accelerator. The Accelerator sits at the Web server and runs as a reverse proxy. It uses standardized compression algorithms to reduce data volume by about 10 percent.

Cennoid Technologies offers FxP Compression. This compression approach, based in part on U.S. Pat. No. 5,949,355, "Method and Apparatus for Adaptive Data Compression," chooses a compression scheme based on the type of data to be compressed. Repeated blocks of characters are encoded while other characters are eliminated. The compression data engine also remembers identical packets of data which have already been compressed.

wwWhoosh Inc. uses proprietary players, incorporated into a user's browser, and servers to accelerate delivery of Web content. The player acts as an Internet proxy and accelerates browser performance. The player also determines whether a requested URL is "wwWhoosh-enabled," i.e., whether the proprietary server has repackaged the content associated with the URL so that it is more efficiently delivered. This approach achieves a compression rate of about 15% per requested page.

Netscaler offers a hardware solution to latency reduction. Cache redirectors are deployed at either the edge of the network or at a content server. The cache redirector sets up persistent connections between content and cache servers and filters out non-cacheable requests (i.e., requests for dynamic content) which cannot be answered by a cache server), which are sent to the content server. Other requests are fulfilled by the cache server.

FineGround Networks has also released products for achieving content acceleration. FineGround's approach is to transmit only the changes to a Web page that have occurred between successive requests from a particular user for the same Web page. FineGround's software is installed at the content provider between the content server and the Internet. This software must keep track of pages in the user's cache by cookie, i.e., if the user has the "base" page to which modifications are made by the material sent by FineGround. The Web page is assembled by Javascript contained in the page sent out by FineGround. FineGround's solution to content acceleration only comes into play when the user requests a page he or she has visited before. This approach requires sending the entire base page if a user does not already have it. It also requires manual tuning to inform the software which pages are similar on the server. Cookies must be enabled on the user's browser and the browser must also support DHTML. The page name must also remain the same on subsequent loads because the delta differencing is based on the page name.

Fireclick, Inc. uses differential caching and predictive caching to reduce Web page service latency. Differential caching breaks each page down into dynamic and static portions. The static portions are templates, and are usually stored in a user's browser (although they are transmitted the first time a user accesses a page) and the dynamic portions only are transmitted each time a user requests a different page. The user receives the dynamic content, a pointer to the cached template in the browser's cache, and instructions for assembling the page. Javascript in the browser interprets the instructions and assembles the page. Latency is further reduced by predictive caching, in which a user's browsing patterns are analyzed and the templates for pages the user is likely to request are "predownloaded" (i.e., sent to the user's browser's cache before the user actually requests the page) to the user's browser. As with FineGround, this approach requires "knowing" what is in the user's cache and requires that a page name must remain the same on subsequent loads since this is the mechanism used to determine which template to select.

Another approach for reducing Web page service latency is hierarchical caching. Information can be cached at several points in the network. Requests are routed to certain caches; as a rule, the request first checks a local cache, then a more distant, larger cache is checked, etc. Routing of requests is normally independent of the item sought—the same caches are checked each time regardless of what is sought. Drawbacks to this approach include difficulties configuring neighbor caches as well as potential problems with network congestion as more and more caches are consulted which may increase any latency associated with using the hierarchical cache approach.

Bang Networks has developed a service to serve real-time information over the Internet without having to refresh Web pages. Bang Networks uses a network of proprietary routers which maintain persistent connections to browsers. The routers store information about user sessions and information flows and use that stored information to route data. Bang customers, or content providers, feed real-time information to the proprietary network and the information is routed through the network to the customers' Web pages. In order to use the service, content providers must modify HTML tags in their documents. As this network "scales" to reach more users, this solution becomes extremely expensive and, as noted above, requires content providers to modify their content.

Another approach to reducing Web page service latency and network burden is Edge Side Includes (ESI), developed by Akamai Technologies, Inc. and Oracle Corporation. ESI is a markup language that describes cacheable and non-cacheable components of Web pages. By using this approach, only non-cacheable components of a Web page need be fetched from the Web site; the cacheable components may be stored at the edge of the network. In order to use this approach, a content provider must rewrite its content to be compatible with ESI and send static data to the service provider.

Most information is transmitted over the Internet in TCP/IP packets. This can be inefficient since numerous round trips are required to open and close each TCP connection. Although HTTP 1.1 now allows for persistent connections, persistent connections are not available to all servers. Additionally, HTTP persistent connections do not support simultaneous requests of inlined objects, which is part of most Web pages. The objects are typically requested one at a time by the browser.

A multiplexing protocol, SMUX Protocol Specification, WD-mux-19980710, has been proposed by W3C which allows multiple objects to be fetched from a Web server approximately simultaneously over a single TCP connection. A TCP connection is multiplexed underneath HTTP. This approach allows sockets to be multiplexed on one socket. However, each individual message is often packaged in its own TCP/IP packet, so small packets may still be transmitted.

The transmission of short TCP/IP packets also creates service latency. Each message or file that is transmitted over a TCP/IP connection is contained in a TCP/IP packet with a 40 byte header. If each message, no matter how short, is sent in a TCP/IP packet, this wastes bandwidth as well as the time to send each TCP/IP packet. For instance, if a 1 byte message is sent via a TCP/IP packet, 41 bytes of data are transmitted for every 1 byte of useful data. If the network is heavily loaded, the congestion resulting from transmission of these small packets can result in lost datagrams, which requires the packet to be retransmitted. In addition, the network is slowed by this congestion and connections may be aborted.

One potential solution to this problem, proposed in IETF RFC 896 by Nagle et al., is to delay sending new TCP segments when new data arrives from a user if any previously transmitted data on the connection remains unacknowledged. Basically, the packet is held to accumulate data. When the acknowledgment for previously transmitted data arrives, or if a packet is filled, the packet is transmitted. However, many short packets may still be transmitted using this algorithm.

An object of this invention is to improve the speed of data communication in a network by minimizing the bandwidth needed and reducing communication latency. Unlike any of the inventions of the prior art, the current invention can achieve compression factors of 50 times or more on real-world dynamically generated web pages and achieves minimum latency with minimum overall system loading by utilizing various technologies such as caching relay hubs, persistent connections between all computers, asynchronous protocols, and re-packaging small TCP requests into a single packet.

SUMMARY OF THE INVENTION

This invention provides an adaptive method and system for compressing and rapidly transmitting data requested by a client from a server. The compression technique can achieve greater compression rates than other currently-available compression tools—for instance a typical Yahoo home page can be compressed down to 1/70th its original size. A series of requests and replies (round trip requests) may be employed to obtain requested data. Software, which may be running on a Web server or a proxy server, is used to encode a reply by converting portions (entire sections, paragraphs, individual lines, etc.) of the data into a single unique code, e.g., typically an 8-byte (64-bit) hash code of the data area encoded although a 4-byte hash code may be used instead in some variants of the encoding algorithm. The encoder stores the code and the corresponding unencoded portion of the data in a database. The process is a recursive compression scheme, so any desired level of compression for any amount of data, down to a single 8-byte code, may be achieved. The encoded first reply is sent to the requesting client, which is running decoder software which includes its own local database.

The decoder receives the first reply and checks its own local database to see if it contains the codes, or identifiers, in the reply. If it does, the first reply is decoded and assembled. However, if any code is missing, the decoder can send a second request for the data corresponding to the missing identifier(s). The definition(s) of the missing identifier(s) is then sent to the client and the reply is decoded and assembled. This process may be repeated several times because a hierarchical encoding scheme is employed which may require several round trip requests to decode requested data.

In one embodiment, if the encoder has never seen any of the data in the reply, it will not send an encoded reply to the requester, since it is highly unlikely that the client could decode the message if the encoder is unfamiliar with all or some of the data. Instead, an unencoded reply is sent; however, the identifier and corresponding unencoded data are stored in the encoder's database. On subsequent requests, if portions of the reply are familiar to the encoder, those portions will be encoded; however, portions of the reply that are unique to the encoder will not be sent in encoded form to the requesting client.

For example, the Yahoo Web page may be requested by a client that is configured to receive encoded replies. An encoded reply, consisting of one 64-bit hash code, H*, which represents the Web page, is sent to the client's decoder. If the database associated with the client's decoder does not recognize H*, it sends a request to the encoder to send the data associated with the hash code. The encoder sends back two hash codes, $H_2$ and $H_3$, in reply. The decoder database recognizes $H_2$, which it received during a prior transmission, and contains the data associated with $H_2$, but does not recognize $H_3$. The decoder then requests the data associated with $H_3$ from the encoder. The data associated with $H_3$ is sent to the decoder, which now has the information necessary to decode the Web page. The decoder database stores the hash codes it receives and uses them to decode subsequent transmissions. This method of compression is therefore adaptive at the client.

To further reduce latency, a new network topology is proposed. The proposed network would utilize hubs which are persistently connected to each other via dedicated sockets. Hubs may be either general purpose computers or special purpose hardware routers. This reduces the latency associated with TCP/IP setup/teardown overhead. Once a connection is established it is maintained. These interconnected hubs create a virtual, persistently-connected net running on top of the existing Internet. These hubs also cache information that is normally flowing through them and can respond to hash code lookup requests that are routed through them on their way to the encoder.

Additionally, a new socket layer, which rides over existing sockets is proposed. This socket layer combines, or multiplexes, messages from multiple machines, threads, and/or processes into one socket and packages these messages into single TCP/IP packets to be relayed along message hubs in the persistent network.

The elements of the invention listed above may be combined to provide a new caching network as well as a content distribution network. This network has the three required features to achieve the maximum possible speed improvement: (1) only data that is truly required is transmitted; (2) data that is transmitted travels the shortest necessary distance; and (3) network latency is minimized.

This invention differs from the approaches in the prior art in one or more major areas: (1) a complete representation of the data that is to be delivered to a client is always sent to the client (2) the client is only sent definitions of identifiers if they are needed by the client (either specifically requested or believed to be needed); (3) since the identifiers are based on any content that has been seen before by the encoder, the encoding is not tied to a single page so that this method accelerates content even if the page or URL has not been seen before by the user; (4) the decoder works with all browsers and does not require cookies; (5) because it leverages all information in a user's cache, the system is capable of compression rates of a single web page far beyond any other methods (100X compression or more is possible on dynamic pages); (6) it does not require specialized hardware to operate efficiently; (7) it is designed to work with a persistent network of connected hubs that also cache data that is passing through them so that identifiers which need resolution can be resolved without sending a packet all the way back to the original encoder; (8) the encoding is hierarchical in that identifiers can represent runs of other identifiers rather than just runs of data; (9) identifiers can be extended to identify subsets of the data within a predefined identifier by appending start/offset information to the identifier so that the amount of data needs to be transmitted is further reduced; and (10) other existing compression algorithms can be combined with this technique to yield further compressions, e.g., using gzip to encode a run of text sent as the definition of an identifier.

BRIEF DESCRIPTION OF THE DRAWINGS

FIGS. 1a and 1b are block diagrams showing exemplary configurations of computer networks in accordance with the invention.

FIGS. 2a-2b are block diagrams showing encoding steps taken by the encoders shown in FIGS. 1a and 1b.

FIG. 3 is a chart showing detection of code runs by the encoder shown in FIGS. 1a and 1b.

FIG. 4 is a flowchart of exemplary steps performed by the encoder shown in FIGS. 1a and 1b.

FIG. 5 is a flowchart of exemplary steps performed by the encoder shown in FIGS. 1a and 1b.

FIGS. 6a and 6b are diagrams showing exemplary decoder requests for data from the encoder shown in FIGS. 1a and 1b.

FIGS. 7 and 8 are plans of exemplary network hubs of a computer network in accordance with the invention.

FIG. 9 is an alternate plan of hubs in a computer network in accordance with the invention.

FIG. 10 is a block diagram of network architecture in accordance with the invention.

FIG. 11a is a flowchart illustrating a prior art approach regarding socket calls.

FIG. 11b is a flowchart illustrating an approach to socket calls by the network architecture shown in FIG. 10.

FIG. 12a is a block diagram of message hubs in a computer network shown in FIG. 7 diagramming the transfer of messages.

FIG. 12b is a block diagram of message hubs in a computer network shown in FIG. 7.

FIG. 13a is a diagram of a TCP/IP packet arrangement in accordance with the prior art.

FIG. 13b is a diagram of a TCP/IP packet containing messages intended for different hubs in accordance with the invention.

FIG. 14 is a diagram of message format for a message shown in FIG. 13b.

FIG. 15 is an alternate diagram of a message format for a message shown in FIG. 13b.

FIG. 16 is a plan for a content distribution network in accordance with the invention.

DETAILED DESCRIPTION OF THE INVENTION

The preferred embodiment described below focuses on Web pages which are encoded using hash codes. However, the scope of the invention is not limited to these types of data or encoding schemes. In fact, the invention works with any language or data with repeated text and various encoding schemes, such as MD5 checksums or 64-bit serial numbers, may be employed. This invention may also be used with content such as instant messaging and video.

With reference to FIG. 1a, a client 18, containing a Web browser 20, decoding software ("decoder") 20, and a hash code database 22, and a server 10, containing encoding software ("encoder") 12 and a hash code database 14, are each connected to a network 16. The decoder 20 can be integrated into the client's 18 operating system or a Web browser. The encoder 12 can be integrated into the server's 10 operating system, Web server, or may be a proxy Web server. In another embodiment, the encoder and decoder 12, 20 can be placed on the same box and the same port for Websites which both generate Web page requests and reply to requests. In yet another embodiment, shown in FIG. 1b, the encoder 12 and the database 14 can be located at an intermediate site 144 between the client 18 and the server 10. With this configuration, more than one site can be encoded.

The encoder 12 compresses replies to Web page requests, sent by a client 18 to a server 10. The compression scheme employed by the encoder 12 is to convert each line of text or each graphic contained in a requested Web page into a single 64-bit hash, or identifier, which is then combined with text corresponding to dynamic content in the Web page in a reply sent to the requesting client's 18 decoder 20 for decoding and assembly. Lines are broken up through use, for instance, of an HTML parser—HTML might break on tags such as <BR> or <P>—or just on the newline character or at any other logical break place in the data. A GIF file, for example, may be broken up every 10K bytes (allowing incremental display at the client) or encoded as a single chunk. Text may be broken up other ways—by words or paragraphs, for instance—in other embodiments.

The basic premise of the communication protocol and the compression technique is illustrated in FIG. 2a. A Web page 26 consisting of 500 lines of text is requested by a client. The encoder generates a 64-bit hash code for each line of text. (A 64-bit hash provides enough potential combinations that the hash code should be sufficiently unique to avoid confusion with other lines' hash codes.) So, for instance, line 1 (L1) 28 is assigned a 64-bit hash number $H_1$ 36. The text for $L_1$ 28 is correlated with $H_1$ 36 and stored in a hash code database. Each line is given a hash code—$L_2$ 30 is assigned $H_2$ 38, $L_3$ 32 is assigned $H_3$ 40, $L_4$ 34 is assigned $H_4$ 42, etc. until finally $L_{500}$ 26 is assigned $H_{500}$ 44. An encoding algorithm is used which ensures that encoding the same strings of data always produces the same result (i.e., the HTML text <HEAD> will always be encoded the same way).

In order to use this approach to compression with HTTP, the decoder must be accessible to the requester and the encoder must be accessible to the server fulfilling the request. The encoder is capable of fulfilling requests from systems running the decoder as well as those which do not have the decoder. The "Accept-Encoding: Propel" instruction in the HTTP request header indicates whether the requestor is capable of using the compression discussed herein. If the "Accept-Encoding:" instruction does not indicate the user is running the decode software, the encoder will not apply the compression technique but merely pass through the request to the web server.

As shown in FIGS. 2a and 3, an additional round of compression can take place by consolidating consecutive hashes the software has seen before into a new 64-bit hash. In FIG. 2a, an intermediate representation 52 of the hash codes is shown. A semi-final representation 54 of hash codes representing the encoded Web page 26 indicates that the $H_1$ 36, $H_2$ 38, and $H_3$ 40 are now represented by another hash code, $H_1^*$ 46. Similarly, hashes $H_5$-$H_{499}$ 56 are now represented by hash code $H_2^*$ 48. As shown in table 58 in FIG. 3, each time the encoder generates hash codes for a document, it can determine whether it has seen consecutive hash codes in the document before. For instance, each of the three times the encoder has generated this particular document (this example assumes that the Web page has the same number of lines each time it is generated), $H_1$, $H_2$, and $H_3$ have been identical (as indicated by the check marks). Consecutive hash codes, or runs, such as these may be represented by a new hash code, $H_1^*$ 46, which is basically a list of hash codes. A review of the table 58 indicates (by an "X") that the hash code for line 4 was different 64 the second time the page was encoded. $H_4$ interrupts the run and therefore this single line will be represented by hash code $H_4$ 42. However, the hash codes representing lines 6-12 (only the first twelve lines of a five hundred line document are in this table 58) have been identical each time the document has been encoded. Therefore, a new hash code $H_2^*$ 48 will represent the hash codes for these lines. Referring again to FIG. 2a, the hash codes obtained through the extra round of compression are contained in the final encoded representation of the document 54. Lines 1-3 are represented by $H_1^*$ 46. Line 4 is represented by hash code $H_4$. Lines 5-499 are represented by hash code $H_2^*$ 48, and line 500 is represented by $H_{500}$ 44. If the encoder has seen all of these codes before, it can further combine all of the hash codes into a single hash code $H_1^{**}$ 240. This compression scheme is recursive; therefore, any data of any length may be compressed to one 8-byte hash code. The encoder may optionally be set so that an 8-byte hash code is created only if the data to be compressed exceeds some threshold, e.g., 12 bytes. If the data is less than that threshold, the identifier for the data would be the data itself.

As shown in FIG. 2b, the encoder will not send an encoded reply containing hash codes that the encoder has not seen at least once before. This situation may occur, for example, when a Web page contains unique dynamic content that is generated "on the fly" specifically for one user. In this example, lines 5-499 62 contain dynamic content. The encoder will represent each line of text with a hash code, but a check of its database will show that the hash codes for lines 5-499 56 have never been seen by the encoder, and so the encoder will decode this portion of the Web page back into text 50 and will only send hash codes in the reply that have been previously generated by the encoder (i.e., $H_1^*$ 46, $H_4$ 42, $H_2^*$ 48, and $H_{500}$ 44). (The database associated with the encoder may be a "Most Recently Used" (MRU) cache. Therefore, unused codes will not be kept in the cache very long and it is likely that unique, dynamic content will not maintain a presence in the encoding database.)

As shown in FIG. 2c, entire pages which are static and do not possess new content can be represented by a single hash code. Here, Web page 64 consists of five lines. The encoder breaks each of these lines into individual hash codes in an intermediate representation 66 of the Web page. However, a check of the database indicates that these hash codes are generated each time the Web page corresponding to the requested URL is encoded. Therefore, the hash codes constitute a run and the entire Web page may be represented by a single hash code $H_1^*$ 68.

FIG. 2d shows that graphics and other binary data can be represented by a single hash code. Here, image file 70 is recognized as a graphics file by the software. If the graphics file is small, e.g., less than 10K, the encoder does not attempt to break the graphics file down, as with text in Web pages, but instead represents the entire with the single hash code $H_1$ 72. The file and the hash code are cached in the software's database. Even if the filename for this image file changes, no extra download of this file is required as long as the file and corresponding hash code are contained in the database. If the graphics file is large, it can be broken up into segments, e.g., 10K each, and can be encoded as in FIG. 2c. This allows a graphic download to be restartable if interrupted and allows the image to be rendered as the data is transmitted.

FIG. 4 illustrates in detail exemplary steps taken by the encoder where the data is a Web page. The software first receives a Web page from the server (block 74). The Web page is then divided into segments (block 76) and hash codes are created for each segment (block 78). The software then determines whether there are consecutive hash codes that have been seen previously in a group (block 80). If there are previously seen consecutive hash codes, these are combined into a single hash code (block 82). This recursive encoding may be repeated until the entire Web page is represented by a single 8-byte hash code. All hash codes and their corresponding data are saved to the hash code database.

Once the encoding process is finished, the software determines, by checking the hash code database, whether any of the hash codes have been generated recently (block 84). If all codes have been recently generated, the reply is sent to the client (block 88). However, if any codes have not been generated recently, they are "exploded" back to their pre-combined format (block 86) (optionally attaching the hash code to the data for next time) and the reply is sent to the requesting client (block 88). Although this "exploding" step is not required, it may be advantageous because, as will be discussed in more detail in FIG. 5, it is usually inefficient to send the user hash codes it probably cannot decode without assistance from the server since the server itself has not seen the hash codes recently.

The encoder can make adjustments for regular page content changes. The encoder keeps track of how many times a given line is seen after N pages. If, over time, a line is only seen once while other lines are seen each time (or at a different rate) the Web page is requested, this indicates the presence of new content. For example, if a Web page containing consecutive lines A, B, and C is requested several times, the encoder will track how many times each line appears. If the page is requested five times, and lines A and B appear four times but line C appears only once and has not recently been seen, a single hash code for lines A and B will be generated and the hash code for line C will be "exploded" and only the text for line C will be sent in the reply. In another embodiment, the exploded text may be compressed using another known compression technique, such as gzip.

This encoding scheme can use "optimistic" techniques to speed encoding. For each requested URL returned by the server, the encoder can look up statistics (number of pages seen, number of consecutive pages seen without a change, length of page, HTTP caching, instructions, date last modified, date expires, hash codes associated with the page) and optionally compare the length of the stored information's page string with the current string. If the page is within the expiration interval or if the pagestring length of the cached information matches the current string, no encoding is necessary and the encoder can send the stored hash code to satisfy the request.

Over time, the encoder can determine whether there is a regular update pattern (i.e., daily, hourly, etc.) and will adjust accordingly. The encoder can also rely on HTTP header information. Each time a page is encoded, the encoder checks to see if the page has been previously encoded and keeps track of which hash codes have been seen recently. Using this approach, the encoder accurately determines over time the fixed and variable portions of replies.

As discussed above, the database, or cache, associated with the encoder may be an MRU cache. Therefore, unused codes do not accumulate and the cache can be relatively small. However, the database associated with the decoder does not necessarily employ an MRU approach and can therefore compile a large record of codes and associated data, significantly reducing the amount of time required to download a page. If a Web page has ten variants, each of which corresponds to one hash code, the user does not have to send any requests to the encoder to determine hash codes once the user has downloaded each of the ten variants since the user will have the hash code for each Web page in the local database.

FIG. 5 illustrates in detail the steps taken by the decoder for Web pages consisting of text. The decoder receives a reply to a Web page request made by a client (block 92). The decoder determines whether the reply contains hash codes (block 94). If not, the Web page is assembled and presented to the requestor (block 96).

If the reply does contain hash codes, the decoder determines whether the client's hash code database has entries corresponding with each hash code (block 98) (basically, if the software has seen any of the hash codes contained in the reply, those hash codes and the corresponding text should be stored in the database). If all the hash codes are contained in the database, the decoder explodes the hash codes into text (block 106). The Web page is then assembled (block 108).

If the database does not have an entry for each hash code, a request asking for the text corresponding to all unknown hash codes is sent to the encoder which created the encoded reply (block 100). This request is processed by the encoder which sends a reply containing the text to the decoder. After receiving and processing the reply (block 102), the decoder determines whether it now possesses all the text necessary to assemble the Web page (block 104). If not, the decoder again queries the encoder for missing text and blocks 100, 102, and 104 are repeated (this process is described in greater detail in FIG. 6b below). This request/reply cycle may be repeated several times depending on the hierarchy of the encoding scheme used. Once the decoder possesses all the text corresponding to the hash codes in the reply, the software explodes these hash codes into text (block 106) and assembles the Web page (block 108).

As shown in FIGS. 6a and 6b, the process in which the encoder has to request text corresponding to unknown hash codes will normally take no more than two request/reply roundtrip exchanges between the decoder and the encoder; this is due to the (usually) two-step encoding process in FIGS. 2a and 2b (depending on the page, the encoding process could be one to 3 steps). In FIG. 6a, a user sends a request for a Web page (block 110). The reply is prepared by the Web server (block 112) and is sent to the encoder to be encoded (block 114). The encoder prepares a reply as described in FIG. 4 above and sends it to the decoder (block 116). Here, the reply consists of $H_1$, text (T), $H_2$, $H_3$, T. The decoder receives the reply and looks up the hash codes in its database (block 118). Here, it does not have text corresponding to $H_1$ and $H_3$, so it sends a request to the encoder to send it the required text for $H_1$ and $H_3$ (block 120). The encoder sends the appropriate text—$T_1$ and $T_3$—to the decoder (block 122). The decoder receives the text, concatenates the packets (block 124) and assembles the Web page (block 126). This required only one roundtrip exchange between the decoding and encoder after the decoder received the encoded reply.

FIG. 6b illustrates a situation in which two roundtrip exchanges between the decoding and encoder are required. A user sends a request for a Web page (block 128). The reply is prepared by the Web server (block 130) and sent to the encoder to be encoded (block 132). A reply—$H_1^*$, T, $H_2$, $H_3$, T—is sent to the decoder (block 134). The decoder receives the reply and looks up the hash codes in its database (block 136). Here, the database does not have text corresponding to $H_1^*$ and $H_3$ and sends a request to the encoder to provide this text (block 138). The decoder sends a reply; $T_3$, which corresponds to $H_3$, is sent along with $H_1$ and $H_4$ which comprise $H_1^*$ (block 140). The decoder receives this reply and checks to see whether the database has text for $H_1$ and $H_4$ (block 142). The text for these hash codes is not in the database, so another request is sent to the encoder to provide the corresponding text for these hash codes (block 144). The encoder receives this request and sends a reply containing $T_1$ and $T_4$, the text corresponding to the hash codes (block 146). The reply is received by the decoder which now possesses the text required to decode the reply. The packets are concatenated (block 148) and the Web page is assembled (block 150). Two roundtrip exchanges between the encoding and decoder were necessary to provide the decoder with the text necessary to decode the reply. As with the encoding process, the decoding process is recursive.

The roundtrip exchange protocol described above is adaptive at the client. Each time the decoder at the client requests information and receives new hash codes from the encoder, the hash codes and the associated data (which may be subsequently received from the encoder in response to requests from the decoder) are stored in the database associated with the decoder. The client is therefore "learning" the hash codes sent with the encoder's replies. The next time a page containing a hash code previously unknown to the client is sent to the client, the client will have the data associated with that hash code in its database. This adaptive aspect of the protocol speeds data communication.

In another embodiment of the encoding technique discussed above, a large file can be broken into segments which are encoded with a single hash code which is transmitted as soon as it is generated. For instance, the encoder can compress a page 20% at a time, thus generating five hash codes, each of which is transmitted immediately upon generation. This approach reduces the latency associated with waiting for the compression of a large file to be completed before sending the requested file to the requester.

In another embodiment of the above approach, for a Web page request, the encoder could send a hash code corresponding to the page template for assembling a dynamic page and a set of hash codes corresponding to the dynamic data. Any unknown hash codes can be requested by the decoder as specified above. The hash codes employed here may be either hierarchical hash codes or "flat" hash codes (expanded to final data in one step). If the page template is unknown to the encoder database, it may be inferred by determining the pages generated with the same base URL.

In another embodiment, one or two byte codes can be used instead of hash codes to represent each segment by ordinal number. For example, a reference, or base, page could be divided into 100-byte segments or into logical segments based on parsing rules applicable to the type of data. Each segment is represented by a two-byte index. The hash code representing the reference page is sent along with the sequence of the two-byte codes interspersed with text as required. A range of text in the reference page may be represented using two 2-byte codes, the start index and the end index. This embodiment is a flexible and compact way to transmit a dynamic Web page when the page is mostly subsets of the reference page.

Another way to take advantage of previously transmitted hash codes is to transmit an 8-byte identifier consisting of a four byte hash code and a four byte "modifier". The first two bytes of this modifier would have a starting offset and the second two bytes would have the length. Using this technique, "subsets" of pre-defined hash codes may be sent easily, without having to define and send new hash codes.

Occasionally, it is advantageous to combine consecutive hash codes regardless of frequency of appearance. If there are a fixed number of Web page variants, there is no advantage to sending lots of hash codes for each page variant; it is more efficient to transmit a single hash code corresponding to the page variants. In cases where there is a large latency in data transmission, the decoding process is less expensive if one single hash code is sent rather than multiple hash codes since the decoder would only have to ask for data associated with a single hash code once instead of requesting data for several hash codes.

In addition to frequency of appearance, other factors may be considered in determining whether a new hash code should be created by combining consecutive hash codes. Among these factors are the amount of underlying data, whether the hash code has appeared in that sequence previously, the number of recursions, and the number of hash codes represented by a single hash code. In one embodiment, the encoding software could be set such that a new hash code is created only if its resulting size is above a certain threshold, e.g., the data represented by the new hash would be at least twice as large as the largest amount of data represented by any of the single hash codes in the group of consecutive hash codes to be combined. Another embodiment would prevent the combination of hash codes if the underlying data represented by the hash codes is less than 100 bytes. The number of recursions could also be restricted so that the combination of hash codes into a single hash code would not occur after a fixed number of combinations had already occurred. It is also possible to restrict the total number of hash codes that can be represented by a single hash code.

Another useful technique for combining hash codes is to maintain a table for each server being encoded (e.g., per Internet domainname) that, for each hash code, has the hash code that appears before it (or 0 if there are many codes that can precede it) and the hash code that appears after it (or 0 if there are many hash codes). Using this approach, it is easy to determine whether a given hash code should start a run (0 for the "preceding" code and a fixed code for the "after" code), end a run (0 for the "after" code and a fixed code for the "before" code), or be included in a run. This technique is desirable for use in encoding web pages since it is independent of the statistics for a particular Web page so that it can be used on sites such as Amazon.com which create unique page names for each user, even though the underlying page template is identical.

For use with modems where there is a high latency whenever data is transmitted, it is highly desirable to reduce the number of round trip requests. This may be accomplished by a number of techniques including: (a) limiting the number of recursions so that there is a single level of hash codes so that hash codes always resolve into data and "adjacent" hash codes (hash codes that directly precede or follow a given hash code in a Web page) are combined into a single hash code which resolves into a single run of data (the concatenation of the data of the combined hash codes); (b) having the encoder (or an intermediate hub) pro-actively transmit along with the hash codes the definition of any hash code that it has reason to believe would be unknown by the decoder (the encoder and hubs can keep statistics on each hash code to determine this likelihood); and (c) having the decoder send along with a web page request, a hash code representing the expected answer to the encoder which can then verify that the data is as the decoder expected and return a confirmation code.

This last technique (c) is particularly important in compressing dynamic Web pages since it is often the case where a server generates a dynamic page and requests the client not to cache the page. In this case, the client cannot issue an "if-changed-since" request to the server, but instead must request the entire page using a normal GET request. However, by sending the hash code of the last page the client received (or the hash codes of the last 10 pages that the client received if there are 10 variants), the encoder can confirm back to the decoder if the web server generated a page that hashed to one of the expected hash codes. This can dramatically reduce the amount of web traffic since it essentially extends the metaphor of the very efficient "if-changed-since" request to dynamic pages, something that was not previously possible. It also does not use excessive memory on the encoder (RAM or disk) since the personalized pages are all stored on the decoder (client) side.

Still another way to determine runs of data is simply to use an existing algorithm such as LZW.

The above embodiments are only a few examples of the possible variants of the same basic encoding/decoding mechanism. In addition to these variations, it is also possible to vary the compression scheme based on the communication attributes of the client relative to the server (e.g., use an algorithm that minimizes round trips for modem links where latency is high and a different algorithm that minimize bandwidth for long-haul digital links where latency is less of a problem but bandwidth is expensive.

It is also possible to apply the encoding/decoding techniques directly to TCP/IP data streams. This can be accomplished by "encapsulating" a given TCP/IP packet inside a TCP/IP packet and encoding the contents and sending the packet to a known decoder near the receiver. For example, suppose a TCP/IP packet is addressed to the CNN web server in Atlanta and suppose there is a router in Los Angeles that receives the packet. The router could "encode" the entire packet (for example, only encoding "full lines" within the packet using the algorithms previously described) and then send this data inside of a TCP/IP packet that is addressed to a decoder in Atlanta. It might also combine packets for the same city in this same packet. The decoder in Atlanta would then take apart the packet, decode each packet, and send each TCP/IP packet along its way to its original destination. This is analogous to a process that could be used to send 100 letters to different locations in France, i.e., fold the letters compactly, stuff them into a single envelope addressed to someone in France, who then opens the envelope, unfolds the letters, and delivers them personally or puts them into a mailbox to be delivered.

A "hash code collision" may occur when two different sets of data hash into the same value. If this occurs, it may be recognized at both the client and server. On the client, or decoder, side, a collision would be recognized after a discrepancy is found during a final check of the page length or checksum of the whole page performed after the entire page is assembled. If a collision is detected, the decoder can invalidate all the hash codes found in that page and request the page again from the server.

When the server generates a page, the encoder can always checks for a collision. If a collision is detected, the text is assigned to be hash code+n (where n is the smallest integer possible to avoid conflict). A potentially more efficient solution is to have the encoder check for collision on certain pages only when notified by the decoder of a problem. Another approach to avoiding hash code collision is to associate hash codes with the domain name of the server; this would reduce the chance of different content providers generating the same hash code.

A "hash timeout" may occur when the encoder is generating new hash codes very quickly when the clients are very slow. Since RAM is finite, and the database associated with the encoder is an MRU cache, a decoder may request a hash code that is no longer available at the encoder's database. This problem may be handled several ways. If a hash code is unavailable, the client may repeat the request. If the client, or decoder, has most of the hash codes now in the server's RAM, the request can be fulfilled faster than previously and there is therefore less chance that the hash code will not be available in the encoder's cache. Another approach is for the server to ensure that it has enough RAM to hold codes generated by the encoder for at least 2 minutes. In another embodiment, a reference count of hash codes transmitted may be kept. Each time a hash code is requested, the count is decremented. If a hash code is about to be purged from the cache and is less than 2 minutes old but has a positive reference count, it is left in the cache. Another solution to this problem is to write all hash codes with a positive reference count to disk. Another approach is to simply send any newly generated hash code definitions along with the response.

A hash timeout may also occur if a load balancer is being used and the hash code lookup request is routed to a different Web server with an encoder plug-in. To avoid this problem, the lookup request includes an internal machine IP address (or some other unique machine identifier, such as a 3-bit hash of the machine's host name). This allows the lookup request to be forwarded to the machine that generated the hash code.

The encoding/decoding approach and the roundtrip exchange protocol discussed above greatly reduces latency in Web page transmission. However, this latency may be further reduced by transmitting requests and replies across a persistent network.

A diagram of such a persistent network is illustrated in FIG. 7. Each member of the network is connected to the next level above by a direct, persistent connection. Each hub (device) can handle more than 1,000 simultaneous connections. A master root 110 handles routing information. A number of root service hubs 112 are persistently connected to the master root 110 by a dedicated socket connection 118. Internet Service Providers (ISPs) may have hubs 114 connected to the root service hubs 112, again by dedicated socket connections 118. The ISP hubs 114 may have one or more root connections. Numerous company hubs 116 may be connected in turn, with dedicated socket connections 118, to the ISP hubs 114. Messages may be routed between the hubs either by software or hardware. New hubs joining the network receive hub numbers, required for operations under the protocol defined by network software, from the root service hubs 112 in a fashion similar to DHCP. This approach creates a virtual network which overlays the Internet.

FIG. 8 illustrates the connections that can be made from company hub 116. Work group hubs 122 may be connected to the company hub 116 via a dedicated socket connection 118. Additionally, persistent peer-to-peer connections 120 may also be made between hubs located at the same level. Individual user hubs 124 may be connected to the work group hub 122 by a dedicated socket connection 118.

While the existence of a persistently connected network reduces the latency associated with TCP/IP connection setup/teardown, service latency may be further reduced by caching frequently requested data at network hubs along the transmission route of the request. Caching the data close to requesters has two consequences: 1) a reduction in the time required to fulfill the request; and 2) a reduction on the burden on the network.

This further reduction in latency is illustrated in FIG. 9. Here, the various computers 126, 128, 130, 138, 140, and 142 are connected to each other via dedicated socket connections 118. User A 138 requests a Web page from a server 126. Server 126 fulfills the request from its cache 134 and sends the reply back to User A 138 through intervening network hubs 128, 130. Hubs 128, 130 each have a cache 134, 136 which can copy the reply at no additional cost since the hubs 128, 130 have to route the packet(s) containing the reply anyway. If the Web page requested by User A 138 is popular, and will be requested frequently not only by User A 138 but also by others such as User B 140 and User C 142, the Web page can be retrieved from caches 136, 134 at the closer hubs 130, 128 rather than sending replies to the host server 126. This technique of pulling frequently requested material to the periphery of the network, closer to those who will request it, reduces the actual distance a request or a reply must travel as well as reducing network load on servers. Page content changes are tracked as discussed above, with new content encoded and sent out to the caches 134, 136 at the periphery of the network as users 138, 140, 142 request pages with new content.

This network of "relay servers" can cache the result of "cache lookups" requested by decoders 20 described in FIG. 5 above. In FIG. 9, as the individual members 128, 130 relay the results of a lookup requested by decoder 20 from encoder 12 at server 126 back to the decoder 20 at requester 138, the results are cached 134, 136 at each hub 128, 130, decreasing service latency the next time a member of the network, eg. 140, 142, requests this information from a server 126. Hubs in the network, either routers or general purpose computers, can examine packets relayed through the hubs to determine if the material is flagged as cacheable. Every node is a caching node. In contrast to caching networks in the prior art, the caches, or databases, at the hubs can cache fragments of a reply (hash code definitions that have been seen before) instead of the entire reply. This moves much of the work involved in replying to data requests to the fringes of the network where there is greater computing power and reduces the processing load on servers located at a "higher" level in this network.

Latency is further reduced by use of a special socket layer riding on top of the existing socket layer; this special socket layer is used in conjuction with the network topology described above to process and relay messages between other members of the network described in FIG. 8; by using the protocol described in greater detail below, each member of this network becomes a message hub.

Sockets are used to communicate between client and server programs and are created with a set of function calls, or programming requests, sometimes known as the application programming interface (API). As shown in FIG. 10, the special socket layer 156 is employed along with an "original" socket layer 154 currently known in the art. Other elements of Internet architecture, the Application layer 152, the TCP layer 150, the IP layer 148, and the Network layer 146 remain unchanged. Special socket layer 156 looks like a regular socket layer to the application 152.

As shown in FIG. 11a, in the prior art a socket call (block 158) goes to the original socket library (block 160) for processing, a socket is created, and the request is transmitted (block 162) to the server. The socket library function socket ( ) creates socket and returns a file descriptor to access the socket, which is associated with a port number and the local host's network address.

FIG. 11b shows exemplary steps taken with the special socket layer of the invention when a user issues a request from a server. A socket call (block 114) first goes to the special socket library for processing (block 166) in which, provided the call is for a request or reply intended to be transmitted using this approach, a socket is created to go to a dedicated port. A route for the request is determined (the hostname's IP address is looked up by a DNS service to determine if the server is equipped with the special socket layer) and, if necessary a new connection to the next level in the network hierarchy is opened. The processed call is then sent to the original socket library for further processing (block 168) and the request is then transmitted to the server (block 170). The special socket layer for combining (i.e., multiplexing) inter-hub messages from multiple machines, threads, and/or processes into a single TCP/IP packet may be formed in the operating system or may be a library routine in the user's application code.

The special socket layer is configured to handle certain ports. In order to establish the dedicated connection, the special socket layer uses the original socket layer to establish the socket connection to the dedicated port of each machine in its message hub cluster. Message hub addresses are obtained by broadcasting and reading IP addresses or Internet host names from a configuration file.

As discussed above and as shown in FIG. 12*a*, members of the persistent network are message hubs 202, 204, 206, 208, 210, 212, 214. The special socket layer, also discussed above, enables multiple messages to be packaged within a single TCP/IP packet and sent to different messages hubs 202, 204, 206, 208, 210, 212, 214 to be processed or relayed to the messages intended destination. Each TCP/IP packet is sent to the next hub in the network, where the message is either processed or repackaged to be sent to the next hub until it reaches its destination.

The routing and repackaging of messages is further illustrated in FIG. 12*b*. A TCP/IP packet 216 containing messages 220, 222, 224, 226 for hub 1 208, hub 2 210, hub 4 206, and hub 10 212 is sent from hub 3 202 to hub 1 208 (TCP/IP header 218 contains the routing information). When the packet 216 is received at hub 1 208, the message 220 intended for hub 1 208 is processed; the other messages 222, 224, 226 are repackaged in new TCP/IP packets to be routed to their destination. For instance, the message 226 for hub 4 206 is packaged in a packet 228 with a TCP/IP header 230 directing the packet to hub 4 206. The messages 222, 224 for hubs 2 210 and 10 212 are repackaged in a new TCP/IP packet 232 with the TCP/IP header 234 routing the packet 232 to hub 2 210. When the TCP/IP packet 234 is received by hub 2 210, the message 222 for hub 2 210 is processed while the message 224 for hub 10 212 is placed in a new TCP/IP packet 236, with a TCP/IP header 238, to be sent from hub 2 210 to hub 10 212.

As shown in FIG. 13*a*, a TCP/IP packet 158 consists of a header 160 of 40 bytes and the payload 162. The payload consists of the data to be sent. In FIG. 13*b*, a TCP/IP packet 164 containing messages 169, 170, 172, 174, 176 is shown. This packet still requires a TCP/IP header 166 of 40 bytes. Referring again to FIGS. 12*a* and *b*, if the TCP/IP packet is going from hub 1 208 to hub 2 210, it can carry messages from hub 3 202 to hub 10 212 or hub 5 204 to hub 11 214 or hub 4 206 to hub 2 210; in other words, it can carry messages from a hub to another hub which is directly or indirectly connected to the sender. Message requests from multiple machines, processes, and threads are multiplexed into a single TCP/IP packet by the special socket layer. Instead of sending separate packets for each message, the special socket layer will either wait until a TCP packet is filled or a predetermined amount of time has passed before sending the packet. This is ideal for sending small messages because it reduces the overhead associated with sending small packets, each with a 40 byte TCP/IP header, in the prior art. Larger files may also be sent if they are fragmented into message-size payloads.

FIG. 14 illustrates the message format. A message 178 contains a 20 byte header. This header contains: a continuation bit 180, which indicates whether a message has been fragmented and there are other messages required to complete the message in its entirety; a length field 182 indicating the length of the message; a version field 184 indicating the protocol version used; a format field 186 indicating the format of the payload; a function field 188 indicating the operation requested; and a caching field indicating whether the forwarding hub can cache the message or handle the message (for instance, a file request that can be satisfied at an intermediate message hub rather than a higher level hub); "DEST HUB #" 192, which indicates the IP address of the message's destination; "DEST QID" 194 which indicates the port number of the message's destination; "SRC HUB#" 96 which indicates the IP address of the message's source; and "SRC QID" 198 which indicates the message's originating port number. Each message can be up to 32K, with a 20 byte fixed overhead (for the message header) per 32K transmitted. However, because of the continuation bit 180, the messages can be of unlimited length. If messages are fragmented, they are reassembled by the network software. Essentially, the message headers provide a 20 byte fully routing protocol.

As shown in FIG. 15, another embodiment of the invention encodes the entire message 240 in the same manner as discussed above in FIGS. 2-6. This approach allows entire client-server messages to be transmitted at just 12 bytes per message without the 20 byte overhead required for each message in the approach detailed above. If the first bit 242, or encoding bit 242, of the message 240 is "1," this indicates that the remaining 95 bits 244 of the message 240 should be appended to the encoding bit 242 to form a 96 bit key. This key is looked up in the hub dictionary. If found, the value is the message packet 240 in its entirety. If the key is not found, the hub requests the corresponding data in the same manner as discussed above in FIGS. 4-6. This approach may be used to transmit requests as well as replies—basically, the content of any message may be encoded in this way. The encoded message contains all the elements of a message set forth in FIG. 14. The encoding is performed transparent to the application that is requesting data or replying to requests for data due to the implementation of the special socket layer described above.

Socket communication between the hubs is asynchronous and continuous. From the hub's viewpoint, it is handling a continuous stream of messages because, when the TCP/IP packet arrives, the special socket layer handles each of the messages in the TCP/IP packet; therefore, messages can be sent independent of TCP/IP boundaries. If a message can be processed by the hub, the hub processes the message. If the message is intended for another hub in the network, the special socket layer repackages that messages in a TCP/IP packet intended for the next hub.

Due to the direct connection between dedicated socket pairs of network members, there is bi-directional asynchronous communication, unlike in other protocols such as HTTP. This protocol allows streaming reads and writes, not just requests and replies. When the hub is handling too many requests, it will stop reading until the volume of messages is such that the hub can return to reading and writing operations.

Each of the elements of the invention discussed above may be implemented alone or in combination with other elements of the invention. For instance, one of the many possible embodiments of this invention is a private content distribution network for a Web site, shown in FIG. 16. Clients 252, 270 in the persistent network 264 can run software 254 that checks the private (persistent) network 264 (which, as noted above, runs within a public network, such as the Internet) for requested information before going to a public network such as the Internet to fulfill a request. As with the decoder, the software may be integrated into the client's operating system, Web browser, or proxy server. (It should be noted that a content provider may have a presence in the private network as well as a public network. The content provider may simply have one port for handling requests and sending replies in the private network and another port or machine for handling requests and sending replies within the public network.)

For instance, suppose client 270 issues a request for information from content provider 268, which is a member of the persistent network 264. The content provider 268 replies to the request and the reply is relayed through hubs 246, 248, and 250 before reaching the client 270. As the reply is relayed through the hubs 246, 248, and 250, the reply is cached in their databases 262, 260, and 258 (see discussion for FIG. 9, above). Now client 252 makes a request of for the same Web page as the first client 270. The software 254 running at client 252 determines the route to the content provider 268 and queries each hub 246, 248 and 250 en route to see if the databases 262, 260, and 258 contain any data needed for the reply.

This lookup can be achieved, for instance, by encoding the URL with the software 254 and checking the database 256 associated with the client's software 254 to see if that particular URL has been requested before. If it has, the static portion of the request is immediately available from the client's 252 database 256. Updated content may be obtained from the content provider 268 or some other member of the network 264. In this instance, the client software 254 can determine the route to the content provider 268 and while the request is traveling along the way to content provider 268 query the intervening hubs 246, 248, and 250 to see if those hubs contain the remaining requested content. In this example, database 258 at hub 250 may contain the remaining content required by client 252 since it cached the reply sent to client 270. In this case, the request is rewritten by software 254 and sent to hub 250. (If client 252 database 256 does not contain static content to be used in the reply to the request, the software 254 queries the hubs' 246, 248, and 250 databases 262, 260, and 258 to see if the information for the reply is stored there.) Content provider 268 is only queried if the intervening hubs 246, 248, and 250 cannot satisfy the client's request. (Each of the databases in the network is a callback cache—i.e., the content provider sends an invalidation message or updated data value to the database caching a particular item. Therefore, when a client requests material that is not a query, e.g., the pages do not have a POST or the URL does not contain a "?," using a URL to check the databases, or caches, will produce current information.)

This selection of hubs used in the hierarchical cache lookup process is dependent on the source of the information requested. In the prior art, the hierarchical lookup is independent of the information requested—a local cache is queried, then a bigger cache, or a backup or mirror cache, etc.; the lookup process is predetermined, regardless of the information requested. In the current invention, the caches, or databases, queried are stored on hubs en route to the content provider; the request would have to pass through these hubs even if the databases were not being queried in order to reach the data source. So, referring again to FIG. 16, if client 252 requests something from content provider 268, the software 254 sequentially queries the hubs' 246, 248, and 250 databases 262, 260, and 258 to see if the information for the reply is stored there. In other words, if the material is not found at database 258, database 260 is queried, etc. until the content provider 268 is reached.

In another embodiment, a content provider can join the private content distribution network without having to install special software or make changes to content. If the content provider decides to join the private network, an encoder in the private network will be assigned to encode, or compress, the content provider's material as discussed above in FIGS. 2-5, above. Referring again to FIG. 16, if content provider 268 joins the private network 264, encoder 266 at hub 246 can compress material requested from the content provider 268. The requested material is subsequently cached throughout the network 264 as discussed above. Most of the work in replying to requests is performed by the encoder 266 and, as information is cached at the edges of the network 264, other hubs 246, 248, and 250 in the network 264. The content provider 268 can also request to be removed from the private network 264, in which case the encoder 266 for content provider 268 is turned off.

A major difference between this technique and that of existing content distribution networks is that with this approach an Internet site may be "accelerated" without any effort on the part of the site owner. This "transparent acceleration" is achieved because of the encoders installed in the Internet cloud and because the client's browser has been modified by means of a plug-in or proxy server such that the browser first tries to load the information from the private network before trying to find the information in the public network. This is a much more attractive option for content distribution than current methods because: (1) it allows data to be cached much closer to the user; (2) data is pulled by the user from the content site to the network edge, rather than pushed by the content site to a content distribution network; (3) it enables "last mile acceleration" because the compressed data is left in compressed format until it is decoded either at the client's corporate decoder, or on the client's desktop, and (4) content sites can instantly turn the service "on" or "off" by requesting that the encoders either encode or stop encoding a particular domainname. This approach to content distribution is particularly important for users connected to the Internet through dial-up lines over modems since it provides a dramatic increase in the speed in which data is transmitted.

The invention claimed is:

1. In a communications network having a plurality of devices which are located at different network nodes, a method of communicating data between devices, said method comprising:
 a) compressing data with software acting as an encoder, said compressing including representing runs of data with at least one identifier, said software running on a first device in network communication with other devices, said at least one identifier to be transmitted in response to a request for the data to a second device in the network running software acting as a decoder;
 b) storing said at least one identifier and corresponding data represented by said at least one identifier in a database associated with said encoder;
 c) determining whether there are any runs of identifiers in compressed data;

d) representing runs of identifiers in compressed data with a single identifier, thereby achieving further compression of said data, the use of the single identifier determined by relative frequency of occurrence of adjacency of the identifiers over a range of transmitted data;

e) storing said single identifier and corresponding runs of identifiers represented by said single identifier in the database associated with said encoder; and f) transmitting from the encoder to the decoder corresponding data represented by said at least one identifier sent in response to the request for data only when said corresponding data represented by said at least one identifier is specifically requested by the decoder, the specifically requested corresponding data enabling decompression of the at least one identifier.

2. The method of claim 1 wherein the single identifier is not used to represent a run of identifiers if the database associated with the encoder has no recently generated record of the run of identifiers.

3. The method of claim 1 wherein identifiers are assigned by breaking up the data to be compressed in chunks.

4. The method of claim 3 wherein the type of data to be compressed determines how the data is broken into chunks.

5. The method of claim 1 further defined by transmitting identifiers to the second device as soon as they are generated.

6. The method of claim 2 further defined by transmitting identifiers to the second device as soon as they are generated.

7. The method of claim 3 further defined by transmitting identifiers to the second device as soon as they are generated.

8. The method of claim 1 further defined by breaking data into segments, generating a single identifier for each segment, and transmitting each identifier as it is generated.

9. The method of claim 1 further defined by the decoder initiating a round trip exchange for corresponding data for specific identifiers not contained in a database associated with the decoder from the encoder, said round trip exchange including a request from the decoder for said corresponding data and a reply to said request for said corresponding data from the encoder.

10. The method of claim 1 further defined by the decoder initiating more than one round trip exchange with the encoder for data corresponding to unknown identifiers.

11. The method of claim 1 further defined by decompressing at the encoder at least a portion of the data to be transmitted when the database associated with the encoder has no recently generated record of the identifier generated by the compressing step.

12. A method of compressing data to be communicated in a network, said method comprising:

a) breaking up data to be compressed into logical segments into logical segments according to data type, said compression including representing runs of data with at least one first identifier;

b) storing said at least one first identifier and data corresponding to said at least one first identifier in a database, further including maintaining a table for each server containing data that is compressed, wherein said table includes any identifier generated and information about identifiers preceding or following any given identifier;

c) detecting runs of identifiers in compressed data, wherein the first identifier is part of a run of identifiers when the table indicates the first identifier has a second identifier preceding the first identifier and a third identifier following the first identifier;

d) representing runs of identifiers in compressed data, each of said runs of identifiers represented by a fourth identifier;

e) storing said fourth identifier and said runs of identifiers represented by said fourth identifier in said database; and f) repeating steps d)-e) as necessary to achieve desired level of compression.

13. The method of claim 12 further including ignoring certain common identifiers to determine whether the first identifier has other identifiers adjacent to the first identifier.

14. The method of claim 12 wherein any known compression method is used to detect runs of identifiers.

* * * * *